(12) United States Patent
Jang et al.

(10) Patent No.: US 12,247,706 B2
(45) Date of Patent: Mar. 11, 2025

(54) BOIL-OFF GAS RELIQUEFACTION SYSTEM

(71) Applicant: DAEWOO SHIPBUILDING & MARINE ENGINEERING CO., LTD., Geoje-si (KR)

(72) Inventors: Jae Hyeoung Jang, Incheon (KR); Sung Kak Lyu, Seoul (KR); Jin Yeol Yu, Geoje-si (KR); Won Jae Choi, Seoul (KR)

(73) Assignee: HANWHA OCEAN CO., LTD., Gyeongsangnam-Do (KR)

( * ) Notice: Subject to any disclaimer, the term of this patent is extended or adjusted under 35 U.S.C. 154(b) by 0 days.

(21) Appl. No.: 17/940,482

(22) Filed: Sep. 8, 2022

(65) Prior Publication Data

US 2023/0019057 A1    Jan. 19, 2023

Related U.S. Application Data

(62) Division of application No. 16/615,748, filed as application No. PCT/KR2017/008375 on Aug. 3, 2017.

(30) Foreign Application Priority Data

Jul. 31, 2017 (KR) .......................... 10-2017-0097318

(51) Int. Cl.
*F25J 1/00* (2006.01)
*B63H 21/38* (2006.01)
(Continued)

(52) U.S. Cl.
CPC ............... *F17C 9/02* (2013.01); *B63H 21/38* (2013.01); *F17C 6/00* (2013.01); *F17C 13/004* (2013.01);
(Continued)

(58) Field of Classification Search
CPC ........ F25J 1/0025; F25J 1/004; F25J 2210/90; F25J 2230/60; F25J 2227/0339;
(Continued)

(56) References Cited

U.S. PATENT DOCUMENTS 5,617,739 A *  4/1997  Little ................... F25B 31/004
                                                      62/619
6,530,240 B1 *  3/2003  Kountz ................. F25J 1/0247
                                                      62/611
(Continued)

FOREIGN PATENT DOCUMENTS

JP         H09-157667 A       6/1997
JP         2009204040 A       9/2009
(Continued)

OTHER PUBLICATIONS

English translation (Year: 2014).*
(Continued)

*Primary Examiner* — John F Pettitt, III
(74) *Attorney, Agent, or Firm* — Hyounggook Lee

(57) ABSTRACT

Disclosed is a BOG reliquefaction system. The BOG reliquefaction system includes: a compressor compressing BOG; a heat exchanger cooling the BOG compressed by the compressor through heat exchange using BOG not compressed by the compressor as a refrigerant; a pressure reducer disposed downstream of the heat exchanger and reducing a pressure of fluid cooled by the heat exchanger; and a second oil filter disposed downstream of the pressure reducer, wherein the compressor includes at least one oil-lubrication type cylinder and the second oil filter is a cryogenic oil filter.

11 Claims, 9 Drawing Sheets

(51) Int. Cl.
*F17C 6/00* (2006.01)
*F17C 9/02* (2006.01)
*F17C 13/00* (2006.01)

(52) U.S. Cl.
CPC ............ *F25J 1/0025* (2013.01); *F25J 1/004* (2013.01); *F17C 2221/033* (2013.01); *F17C 2227/0339* (2013.01); *F17C 2265/017* (2013.01); *F17C 2265/033* (2013.01); *F17C 2265/037* (2013.01); *F17C 2265/038* (2013.01); *F25J 2210/90* (2013.01); *F25J 2230/60* (2013.01)

(58) Field of Classification Search
CPC ............ F25J 2265/033; F25J 2265/034; F25J 2265/037; F25J 2265/038; F25B 43/02; F25B 43/003; B01D 19/0031; B01D 24/16
See application file for complete search history.

(56) References Cited

U.S. PATENT DOCUMENTS

| | | | |
|---|---|---|---|
| 6,581,409 B2 | 6/2003 | Wilding et al. | |
| 2007/0107465 A1* | 5/2007 | Turner | F25J 1/0201 62/613 |
| 2012/0144789 A1* | 6/2012 | Schnacke | B01D 46/2411 55/482 |
| 2014/0290279 A1 | 10/2014 | Lee et al. | |
| 2016/0114876 A1 | 4/2016 | Lee et al. | |
| 2018/0216878 A1* | 8/2018 | Tezuka | F25J 1/0297 |
| 2018/0224205 A1 | 8/2018 | Baxter et al. | |
| 2018/0327056 A1 | 11/2018 | Lee et al. | |

FOREIGN PATENT DOCUMENTS

| | | | | |
|---|---|---|---|---|
| JP | 2013511004 A | | 3/2013 | |
| JP | 2015505941 A | | 2/2015 | |
| KR | 100498383 B1 | * | 7/2005 | |
| KR | 10-2014-0075582 A | | 6/2014 | |
| KR | 20140075584 A | * | 6/2014 | ............ F25J 1/0042 |
| KR | 20140076482 A | * | 6/2014 | |
| KR | 10-2015-0067094 A | | 6/2015 | |
| KR | 20150062826 A | * | 6/2015 | |
| KR | 10-2016-0044099 A | | 4/2016 | |
| KR | 10-2016-0062300 A | | 6/2016 | |
| KR | 10-2016-0142257 A | | 12/2016 | |
| KR | 20160142257 A | * | 12/2016 | |
| WO | 2017/082552 A | | 5/2017 | |
| WO | WO-2017082552 A1 | * | 5/2017 | ............ B63B 25/16 |

OTHER PUBLICATIONS

KR100498383 translation (Year: 2005).*
International Search Report dated Apr. 25, 2018 in PCT Application No. PCT/KR2017/008375.
Office Action dated Sep. 17, 2018 in Korean Patent Application No. 10-2017-0097318.
Office Action dated Apr. 6, 2021 in Chinese Patent Application No. 201780091037.1.
Written Opinion dated Apr. 26, 2021 in Singaporean Patent Application No. 11201909780T.
Office Action dated Jul. 13, 2021 in Japanese Patent Application No. 2019-559739.
Written Opinion dated Jun. 2, 2022 in Singaporean Patent Application No. 11201909780T.
Extended European Search Report dated Apr. 9, 2021 in European Patent Application No. EP17920345.
Written Opinion of corresponding Singaporean Patent Application No. 11201909780T dated Jun. 2, 2020. 8 pages.

* cited by examiner (a)

(b)

(a)

(b)

BOIL-OFF GAS RELIQUEFACTION SYSTEM

TECHNICAL FIELD

The present invention relates to a method and system for reliquefaction of boil-off gas (BOG) generated through natural evaporation of liquefied gas, and more particularly, to a boil-off gas reliquefaction system, in which, among boil-off gas generated in a storage tank of a liquefied natural gas (LNG) vessel to be supplied as fuel to an engine, surplus boil-off gas above fuel requirement of the engine is re-liquefied using the boil-off gas as a refrigerant.

BACKGROUND ART

Recently, consumption of liquefied gas such as liquefied natural gas (LNG) has been rapidly increasing worldwide. Liquefied gas obtained by cooling natural gas to an extremely low temperature has a much smaller volume than natural gas and thus is much more suitable for storage and transportation. In addition, since air pollutants in natural gas can be reduced or removed during a liquefaction process, liquefied gas such as LNG is an eco-friendly fuel that has low air pollutant emissions upon combustion.

LNG is a colorless and transparent liquid obtained by cooling natural gas mainly composed of methane to about −163° C. to liquefy the natural gas and has a volume of about $\frac{1}{600}$ that of natural gas. Thus, liquefaction of natural gas enables very efficient transportation.

However, since natural gas is liquefied at an extremely low temperature of −163° C. under normal pressure, LNG can easily evaporate by a small change in temperature. Although an LNG storage tank is insulated, external heat can be continuously transferred to the storage tank, causing LNG in transit to naturally evaporate, thereby generating boil-off gas (BOG).

Generation of BOG means a loss of LNG and thus has a great influence on transportation efficiency. In addition, when BOG accumulates in a storage tank, there is a risk of pressure inside the storage tank excessively increasing, causing damage to the tank. Various studies have been conducted to treat BOG generated in an LNG storage tank. Recently, for treatment of BOG, there has been proposed a method in which BOG is re-liquefied to be returned to an LNG storage tank, a method in which BOG is used as an energy source in a source of fuel consumption such as a marine engine, and the like.

Examples of a method for re-liquefaction of BOG include a method of using a refrigeration cycle with a separate refrigerant in which BOG is allowed to exchange heat with the refrigerant to be re-liquefied and a method of using BOG as a refrigerant to re-liquefy BOG without any separate refrigerant. Particularly, a system employing the latter method is called a partial re-liquefaction system (PRS).

Examples of a marine engine capable of being fueled by natural gas include gas engines such as a DFDE engine, an X-DF engine, and an ME-GI engine.

A DFDE engine has four strokes per cycle and uses the Otto cycle in which natural gas having a relatively low pressure of about 6.5 bar is injected into a combustion air inlet, followed by pushing a piston upward to compress the gas.

An X-DF engine has two strokes per cycle and uses the Otto cycle using natural gas having a pressure of about 16 bar as fuel.

An ME-GI engine has two strokes per cycle and uses a diesel cycle in which natural has having a high-pressure of about 300 bar is injected directly into a combustion chamber in the vicinity of the top dead center of a piston.

DISCLOSURE

Technical Problem

As such, when boil-off gas (BOG) generated in a liquefied natural gas (LNG) storage tank is compressed and re-liquefied through heat exchange using the boil-off gas without a separate refrigerant, it is necessary to compress the BOG at high pressure for reliquefaction efficiency using an oil-lubrication type cylinder.

Boil-off gas compressed by the oil-lubrication type cylinder compressor contains lubricant oil. The inventors of the present invention found that the lubricant oil contained in the compressed BOG is condensed or solidified prior to the BOG and blocks a fluid channel of the heat exchanger during cooling of the compressed BOG in a heat exchanger. Particularly, a printed circuit heat exchanger (PCHE) having a narrow fluid channel (for example, micro-fluid channel type fluid channel) suffers from more frequent clogging of the fluid channel due to the condensed or solidified lubricant oil.

Accordingly, the inventors of the present invention have developed various techniques for separating the lubricant oil from the compressed BOG in order to prevent the condensed or solidified lubricant oil from clogging the fluid channel of the heat exchanger.

Embodiments of the present invention provide a method and system for relieving or preventing clogging of a fluid channel of a heat exchanger by condensed or solidified lubricant oil and capable of removing the condensed or solidified lubricant oil clogging the fluid channel of the heat exchanger through a simple and economical process.

Technical Solution

In accordance with one aspect of the present invention, there is provided a BOG reliquefaction system including: a compressor compressing BOG; a heat exchanger cooling the BOG compressed by the compressor through heat exchange using BOG not compressed by the compressor as a refrigerant; a pressure reducer disposed downstream of the heat exchanger and reducing a pressure of fluid cooled by the heat exchanger; and a second oil filter disposed downstream of the pressure reducer, wherein the compressor includes at least one oil-lubrication type cylinder and the second oil filter is a cryogenic oil filter.

In accordance with another aspect of the present invention, there is provided a BOG reliquefaction system including: a compressor compressing BOG; a heat exchanger cooling the BOG compressed by the compressor through heat exchange using BOG not compressed by the compressor as a refrigerant; a pressure reducer disposed downstream of the heat exchanger and reducing a pressure of fluid cooled by the heat exchanger; a gas/liquid separator disposed downstream of the pressure reducer and separating the BOG into liquefied gas generated through reliquefaction and gaseous BOG; and a second oil filter disposed on a fifth supply line through which the liquefied gas separated by the gas/liquid separator is discharged, wherein the compressor includes at least one oil-lubrication type cylinder and the second oil filter is a cryogenic oil filter.

In accordance with a further aspect of the present invention, there is provided a BOG reliquefaction system including: a compressor compressing BOG; a heat exchanger cooling the BOG compressed by the compressor through heat exchange using BOG not compressed by the compressor as a refrigerant; a pressure reducer disposed downstream of the heat exchanger and reducing a pressure of fluid cooled by the heat exchanger; a gas/liquid separator disposed downstream of the pressure reducer and separating the BOG into liquefied gas generated through reliquefaction and gaseous BOG; and a second oil filter disposed on a sixth supply line through which the gaseous BOG separated by the gas/liquid separator is discharged, wherein the compressor includes at least one oil-lubrication type cylinder and the second oil filter is a cryogenic oil filter.

The second oil filter may separate lubricant oil having a solid phase.

The BOG reliquefaction system may further include a gas/liquid separator disposed downstream of the pressure reducer and separating the BOG into liquefied gas generated by reliquefaction and gaseous BOG, wherein the second oil filter is disposed between the pressure reducer and the gas/liquid separator.

The second oil filter may be an upward discharge type.

The liquefied gas separated by the gas/liquid separator and discharged along the fifth supply line may be sent to a storage tank.

The second oil filter may be a downward discharge type.

The compressor may compress the BOG to a pressure of 150 bar to 350 bar.

The compressor may compress the BOG to a pressure of 80 bar to 250 bar.

The heat exchanger may include a micro-channel type fluid channel.

The heat exchanger may be a printed circuit heat exchanger (PCHE).

The BOG reliquefaction system may further include a bypass line through which the BOG is supplied to the compressor after bypassing the heat exchanger.

The BOG reliquefaction system may further include a first valve disposed upstream of a cold fluid channel of the heat exchanger and regulating a flow rate of fluid and opening/closing of a corresponding supply line, wherein the bypass line may be branched from the corresponding supply line upstream of the first valve.

The BOG reliquefaction system may further include a second valve disposed downstream of the cold fluid channel of the heat exchanger and regulating a flow rate of fluid and opening/closing of a corresponding supply line, wherein the bypass line is joined to the corresponding supply line downstream of the second valve.

The BOG reliquefaction system may further include a first oil filter disposed downstream of the compressor and separating lubricant oil from the BOG.

The first oil filter may separate lubricant oil having a vapor phase or mist phase.

In accordance with yet another aspect of the present invention, there is provided a method of discharging lubricant oil from a BOG reliquefaction system configured to reliquefy BOG by compressing the BOG by a compressor, cooling the compressed BOG through heat exchange with non-compressed BOG by a heat exchanger, and reducing a pressure of fluid cooled through heat exchange by a pressure reducer, wherein BOG to be used as a refrigerant in the heat exchanger is supplied to the heat exchanger along a first supply line, the BOG used as the refrigerant in the heat exchanger is supplied to the compressor along a second supply line, and BOG not used as the refrigerant in the heat exchanger may be supplied to the compressor along a bypass line bypassing the heat exchanger, and wherein a bypass valve for regulating a flow rate of fluid and opening/closing of a corresponding supply line is disposed on the bypass line, a first valve for regulating a flow rate of fluid and opening/closing of a corresponding supply line is disposed on the first supply line upstream of the heat exchanger, a second valve for regulating a flow rate of fluid and opening/closing of a corresponding supply line is disposed on the second supply line downstream of the heat exchanger, and the compressor comprises at least one oil-lubrication type cylinder, the compressor may compress the BOG to a pressure of 150 bar to 350 bar, the lubricant oil discharge method including: 2) opening the bypass valve while closing the first valve and the second valve; 3) sending the BOG not used as the refrigerant in the heat exchanger to the compressor along the bypass line, followed by compression by the compressor; and 4) sending part or all of the BOG compressed by the compressor to the heat exchanger, condensed or solidified lubricant oil being discharged from the BOG reliquefaction system after being melted or reduced in viscosity by the BOG increased in temperature during compression by the compressor.

In accordance with yet another aspect of the present invention, there is provided a BOG reliquefaction system including: a compressor compressing BOG; a heat exchanger cooling the BOG compressed by the compressor through heat exchange using BOG discharged from a storage tank as a refrigerant; a first valve for regulating a flow rate of fluid and opening/closing of a corresponding supply line disposed on the first supply line through which BOG to be used as the refrigerant in the heat exchanger is supplied to the heat exchanger; a second valve for regulating a flow rate of fluid and opening/closing of a corresponding supply line disposed on a second supply line through which the BOG used as the refrigerant in the heat exchanger is supplied to the compressor; a bypass line through which the BOG is supplied to the compressor after bypassing the heat exchanger; and a pressure reducer disposed downstream of the heat exchanger and reducing a pressure of fluid cooled by the heat exchanger, wherein the compressor includes at least one oil-lubrication type cylinder and compresses the BOG to a pressure of 150 bar to 350 bar, and the bypass line is branched from the first supply line upstream of the first valve and joined to the second supply line downstream of the second valve.

In accordance with yet another aspect of the present invention, there is provided a method of discharging lubricant oil from a BOG reliquefaction system configured to reliquefy BOG by compressing the BOG by a compressor, cooling the compressed BOG through heat exchange with non-compressed BOG by a heat exchanger, and reducing a pressure of fluid cooled through heat exchange by a pressure reducer, wherein the compressor includes at least one oil-lubrication type cylinder, the BOG is sent to the compressor through a bypass line bypassing the heat exchanger and compressed by the compressor, the BOG compressed by the compressor is supplied to an engine, and surplus BOG not supplied to the engine is supplied to the heat exchanger to discharge condensed or solidified lubricant oil after melting the lubricant oil or reducing viscosity thereof using the BOG increased in temperature during compression by the compressor.

In accordance with yet another aspect of the present invention, there is provided a method of discharging lubricant oil from a BOG reliquefaction system configured to reliquefy BOG using the BOG as a refrigerant, wherein a heat exchanger cools BOG compressed by a compressor through heat exchange using BOG discharged from a storage tank as the refrigerant upon BOG reliquefaction; the compressor includes at least one oil-lubrication type cylinder; and condensed or solidified lubricant oil is discharged by a bypass line disposed to bypass the heat exchanger and used in overhaul of the heat exchanger after being melted or reduced in viscosity.

In accordance with yet another aspect of the present invention, there is provided an engine fuel supply method, wherein fuel is supplied to an engine during discharge of condensed or solidified lubricant oil by melting the condensed or solidified lubricant oil or reducing viscosity thereof.

In accordance with yet another aspect of the present invention, there is provided a BOG reliquefaction system including: a compressor compressing BOG; a heat exchanger cooling the BOG compressed by the compressor through heat exchange using BOG not compressed by the compressor as a refrigerant; a pressure reducer disposed downstream of the heat exchanger and reducing a pressure of fluid cooled by the heat exchanger; and a gas/liquid separator disposed downstream of the pressure reducer and separating the BOG into liquefied gas generated by reliquefaction and gaseous BOG, wherein the compressor includes at least one oil-lubrication type cylinder, and the gas/liquid separator is connected to a lubricant oil discharge line through which lubricant oil collected in the gas/liquid separator is discharged.

In accordance with yet another aspect of the present invention, there is provided a method of discharging lubricant oil from a BOG reliquefaction system configured to reliquefy BOG using the BOG as a refrigerant, wherein lubricant oil collected in a gas/liquid separator is discharged from the gas/liquid separator through a lubricant oil discharge line separate from a fifth supply line through which liquefied gas generated by reliquefaction of the BOG is discharged from the gas/liquid separator.

In accordance with yet another aspect of the present invention, there is provided a BOG reliquefaction system including: a compressor compressing BOG; a heat exchanger cooling the BOG compressed by the compressor through heat exchange using BOG not compressed by the compressor as a refrigerant; a pressure reducer disposed downstream of the heat exchanger and reducing a pressure of fluid cooled by the heat exchanger; and at least one of a combination of a first temperature sensor disposed upstream of a cold fluid channel of the heat exchanger and a fourth temperature sensor disposed downstream of a hot fluid channel of the heat exchanger, a combination of a second temperature sensor disposed downstream of the cold fluid channel of the heat exchanger and a third temperature sensor disposed upstream of the hot fluid channel of the heat exchanger, and a combination of a first pressure sensor disposed upstream of the hot fluid channel of the heat exchanger and a second pressure sensor disposed downstream of the hot fluid channel of the heat exchanger, wherein the compressor includes at least one oil-lubrication type cylinder.

In accordance with yet another aspect of the present invention, there is provided a BOG reliquefaction system including: a compressor compressing BOG; a heat exchanger cooling the BOG compressed by the compressor through heat exchange using BOG not compressed by the compressor as a refrigerant; a pressure reducer disposed downstream of the heat exchanger and reducing a pressure of fluid cooled by the heat exchanger; and at least one of a combination of a first temperature sensor disposed upstream of a cold fluid channel of the heat exchanger and a fourth temperature sensor disposed downstream of a hot fluid channel of the heat exchanger, a combination of a second temperature sensor disposed downstream of the cold fluid channel of the heat exchanger and a third temperature sensor disposed upstream of a hot fluid channel of the heat exchanger, and a pressure difference sensor measuring a pressure difference between upstream of the hot fluid channel of the heat exchanger and downstream of the hot fluid channel of the heat exchanger, wherein the compressor includes at least one oil-lubrication type cylinder.

In accordance with yet another aspect of the present invention, there is provided a BOG reliquefaction system configured to reliquefy BOG by compressing the BOG by a compressor, cooling the compressed BOG through heat exchange with non-compressed BOG by a heat exchanger, and reducing a pressure of fluid cooled through heat exchange by a pressure reducer, wherein the compressor includes at least one oil-lubrication type cylinder and an alarm is generated upon detection of malfunction of the heat exchanger.

In accordance with yet another aspect of the present invention, there is provided a method of discharging lubricant oil from a BOG reliquefaction system configured to reliquefy BOG using the BOG as a refrigerant, wherein the BOG is cooled by a heat exchanger using the BOG as the refrigerant upon reliquefaction of the BOG, and it is determined whether it is time to discharge condensed or solidified lubricant oil, based on a lower value between a temperature difference between a temperature measured by a first temperature sensor disposed upstream of a cold fluid channel of the heat exchanger and a temperature measured by a fourth temperature sensor disposed downstream of a hot fluid channel of the heat exchanger, and a temperature difference between a temperature measured by a second temperature sensor disposed downstream of the cold fluid channel of the heat exchanger and a temperature measured by a third temperature sensor disposed upstream of the hot fluid channel of the heat exchanger, or based on a pressure difference between a pressure measured by a first pressure sensor disposed upstream of the hot fluid channel of the heat exchanger and a pressure measured by a second pressure sensor disposed downstream of the hot fluid channel of the heat exchanger.

In accordance with yet another aspect of the present invention, there is provided a method of discharging lubricant oil from a BOG reliquefaction system configured to reliquefy BOG using the BOG as a refrigerant, wherein the BOG is cooled by a heat exchanger using the BOG as the refrigerant upon reliquefaction of the BOG, and it is determined whether it is time to discharge condensed or solidified lubricant oil, based on a lower value between a temperature difference between a temperature measured by a first temperature sensor disposed upstream of a cold fluid channel of the heat exchanger and a temperature measured by a fourth temperature sensor disposed downstream of a hot fluid channel of the heat exchanger, and a temperature difference between a temperature measured by a second temperature sensor disposed downstream of the cold fluid channel of the heat exchanger and a temperature measured by a third temperature sensor disposed upstream of the hot fluid channel of the heat exchanger, or based on a pressure difference measured by a pressure difference sensor for measuring a pressure difference between upstream of the hot fluid channel of the heat exchanger and downstream of the hot fluid channel of the heat exchanger.

In accordance with yet another aspect of the present invention, there is provided a method of discharging lubricant oil from a BOG reliquefaction system configured to reliquefy BOG by compressing the BOG by a compressor, cooling the compressed BOG through heat exchange with non-compressed BOG by a heat exchanger, and reducing a pressure of fluid cooled through heat exchange by a pressure reducer, wherein the compressor includes at least one oil-lubrication type cylinder and it is determined that it is time to discharge condensed or solidified lubricant oil, if at least one of the following conditions is satisfied: a condition that a temperature difference between the BOG upstream of the heat exchanger to be used as a refrigerant in the heat exchanger and the BOG compressed by the compressor and cooled by the heat exchanger (hereinafter referred to as "temperature difference of a cold flow") is a first preset value or more and continues for a predetermined period of time or more; a condition that a temperature difference between the BOG used as the refrigerant in the heat exchanger and the BOG compressed by the compressor and sent to the heat exchanger (hereinafter referred to as "temperature difference of a hot flow") is the first preset value or more and continues for a predetermined period of time or more; and a condition that a pressure difference between the BOG compressed by the compressor and sent to the heat exchanger at a location upstream of the heat exchanger and the BOG cooled by the heat exchanger at a location downstream of the heat exchanger (hereinafter referred to as "pressure difference of a hot fluid channel") is a second preset value or more and continues for a predetermined period of time or more.

In accordance with yet another aspect of the present invention, there is provided a method of discharging lubricant oil from a BOG reliquefaction system configured to reliquefy BOG by compressing the BOG by a compressor, cooling the compressed BOG through heat exchange with non-compressed BOG by a heat exchanger, and reducing a pressure of fluid cooled through heat exchange by a pressure reducer, wherein the compressor includes at least one oil-lubrication type cylinder and it is determined that it is time to discharge condensed or solidified lubricant oil, if a lower value between a temperature difference between the BOG upstream of the heat exchanger to be used as a refrigerant in the heat exchanger and the BOG compressed by the compressor and cooled by the heat exchanger (hereinafter referred to as "temperature difference of a cold flow") and a temperature difference between the BOG used as the refrigerant in the heat exchanger and the BOG compressed by the compressor and sent to the heat exchanger (hereinafter referred to as "temperature difference of a hot flow") is a first preset value or more and continues for a predetermined period of time or more, or if a pressure difference between the BOG compressed by the compressor and sent to the heat exchanger at a location upstream of the heat exchanger and the BOG cooled by the heat exchanger at a location downstream of the heat exchanger (hereinafter referred to as "pressure difference of a hot fluid channel") is a second preset value or more and continues for a predetermined period of time or more.

In accordance with yet another aspect of the present invention, there is provided a method of discharging lubricant oil from a BOG reliquefaction system configured to reliquefy BOG using the BOG as a refrigerant, wherein a time point for discharging condensed or solidified lubricant oil is determined based on at least one of a temperature difference and a pressure difference of equipment and an alarm is generated to indicate the time point for discharging the condensed or solidified lubricant oil.

In accordance with yet another aspect of the present invention, there is provided a BOG reliquefaction system including: a compressor compressing BOG; a heat exchanger cooling the BOG compressed by the compressor through heat exchange using BOG not compressed by the compressor as a refrigerant; and a pressure reducer reducing a pressure of fluid cooled by the heat exchanger, the BOG reliquefaction system further including: a detection unit disposed upstream and/or downstream of the heat exchanger to detect whether the heat exchanger is clogged by lubricant oil; and an alarm indicating that the heat exchanger is clogged by the lubricant oil, based on a detection result of the detection unit.

In accordance with yet another aspect of the present invention, there is provided a BOG reliquefaction system including: a compressor compressing BOG; a heat exchanger cooling the BOG compressed by the compressor through heat exchange using BOG not compressed by the compressor as a refrigerant; a pressure reducer disposed downstream of the heat exchanger and reducing a pressure of fluid cooled by the heat exchanger; a bypass line disposed upstream of the heat exchanger such that the BOG to be used as the refrigerant in the heat exchanger is supplied to the compressor along the bypass line bypassing the heat exchanger; and a bypass valve disposed on the bypass line and regulating a flow rate of fluid and opening/closing of the bypass line, wherein the bypass valve is partially or totally opened when a pressure of the BOG supplied to the compressor is lower than an intake pressure condition for the compressor.

In accordance with yet another aspect of the present invention, there is provided a method of supplying fuel to an engine of a BOG reliquefaction system configured to reliquefy BOG by compressing the BOG by a compressor, cooling the compressed BOG through heat exchange with non-compressed BOG by a heat exchanger, and reducing a pressure of fluid cooled through heat exchange by a pressure reducer, wherein part or all of the BOG to be supplied to the compressor is supplied to the compressor after bypassing the heat exchanger, when a pressure of the BOG supplied to the compressor is lower than an intake pressure condition for the compressor.

In accordance with yet another aspect of the present invention, there is provided a BOG reliquefaction system including: a compressor compressing BOG; a heat exchanger cooling the BOG compressed by the compressor through heat exchange using BOG discharged from a storage tank as a refrigerant; a bypass line through which the BOG is supplied to the compressor after bypassing the heat exchanger; a second valve disposed on a second supply line through which the BOG used as the refrigerant in the heat exchanger is supplied to the compressor, the second valve regulating a flow rate of fluid and opening/closing of the second supply line; and a pressure reducer disposed downstream of the heat exchanger and reducing a pressure of fluid cooled by the heat exchanger, wherein the compressor includes at least one oil-lubrication type cylinder and the bypass line is joined to the second supply line downstream of the second valve.

In accordance with yet another aspect of the present invention, there is provided a method of discharging lubricant oil from a BOG reliquefaction system configured to reliquefy BOG by compressing the BOG by a compressor, cooling the compressed BOG through heat exchange with non-compressed BOG by a heat exchanger, and reducing a pressure of fluid cooled through heat exchange by a pressure reducer, wherein the compressor includes at least one oil-lubrication type cylinder, and a second valve for regulating a flow rate of fluid and opening/closing of a corresponding supply line is disposed on a second supply line through which the BOG used as the refrigerant in the heat exchanger is supplied to the compressor, and wherein the BOG is compressed by the compressor after bypassing the heat exchanger through the bypass line, surplus BOG exceeding an engine fuel requirement is supplied to the heat exchanger to discharge condensed lubricant oil after melting the condensed lubricant oil by the BOG increased in temperature during compression by the compressor, and the bypass line is joined to the second supply line downstream of the second valve.

In accordance with yet another aspect of the present invention, there is provided a BOG reliquefaction system including: a compressor compressing BOG; a heat exchanger cooling the BOG compressed by the compressor through heat exchange using BOG discharged from a storage tank as a refrigerant; a bypass line through which the BOG is supplied to the compressor after bypassing the heat exchanger; a first valve disposed on a first supply line through which the BOG to be used as a refrigerant in the heat exchanger is supplied to the heat exchanger, the first valve regulating a flow rate of fluid and opening/closing of the first supply line; and a pressure reducer disposed downstream of the heat exchanger and reducing a pressure of fluid cooled by the heat exchanger, wherein the compressor includes at least one oil-lubrication type cylinder and the bypass line is branched from the first supply line upstream of the first valve.

In accordance with yet another aspect of the present invention, there is provided a BOG reliquefaction system including: a compressor compressing BOG; a heat exchanger cooling the BOG compressed by the compressor through heat exchange using BOG discharged from a storage tank as a refrigerant; a bypass line through which the BOG is supplied to the compressor after bypassing the heat exchanger, the bypass line being branched from a first supply line through which BOG to be used as the refrigerant in the heat exchanger is supplied to the heat exchanger; a pressure reducer disposed downstream of the heat exchanger and reducing a pressure of fluid cooled by the heat exchanger; and a gas/liquid separator disposed downstream of the pressure reducer and separating the BOG into liquefied gas generated through reliquefaction and gaseous BOG, wherein the compressor includes at least one oil-lubrication type cylinder and the gaseous BOG separated by the gas/liquid separator is discharged from the gas/liquid separator along a sixth supply line, the sixth supply line being joined to the first supply line upstream of a branched point of the bypass line.

Advantageous Effects

According to embodiments of the invention, it is possible to remove condensed or solidified lubricant oil inside a heat exchanger through a simple and economical process using existing equipment without installation of separate equipment or supply of a separate fluid for removing the lubricant oil.

According to the embodiments of the invention, it is possible to overhaul the heat exchanger while continuing operation of an engine by driving the engine during removal of the condensed or solidified lubricant oil. In addition, it is possible to remove the condensed or solidified lubricant oil using surplus BOG not used by the engine. Furthermore, it is possible to burn the lubricant oil mixed with the BOG using the engine.

According to the embodiments of the invention, it is possible to efficiently discharge the molten or viscosity-reduced lubricant oil using an improved gas/liquid separator if the lubricant oil is collected in the gas/liquid separator.

According to the embodiments of the invention, a cryogenic oil filter is disposed on at least one of a location downstream of a pressure reducer, a fifth supply line through which liquefied gas is discharged from the gas/liquid separator, and a sixth supply line through which the BOG is discharged from the gas/liquid separator, thereby achieving efficient removal of the lubricant oil mixed with the BOG.

According to the embodiments of the invention, it is possible to satisfy an intake pressure condition for a compressor and engine fuel requirement for an engine while maintaining reliquefaction performance through a simple and economical process even with existing equipment without separate equipment.

BEST MODE

Hereinafter, embodiments of the present invention will be described in detail with reference to the accompanying drawings. BOG reliquefaction systems according to the present invention may be applied to various vessels, such as vessels equipped with engines fueled by natural gas, vessels including liquefied gas storage tanks, marine structures, and the like. It should be understood that the following embodiments can be modified in various ways and do not limit the scope of the present invention.

Further, fluid in each fluid supply line of a system according to the present invention may have a liquid phase, a vapor-liquid mixed phase, a vapor phase, and a supercritical fluid phase depending upon operation conditions of the system.

Figure 1:
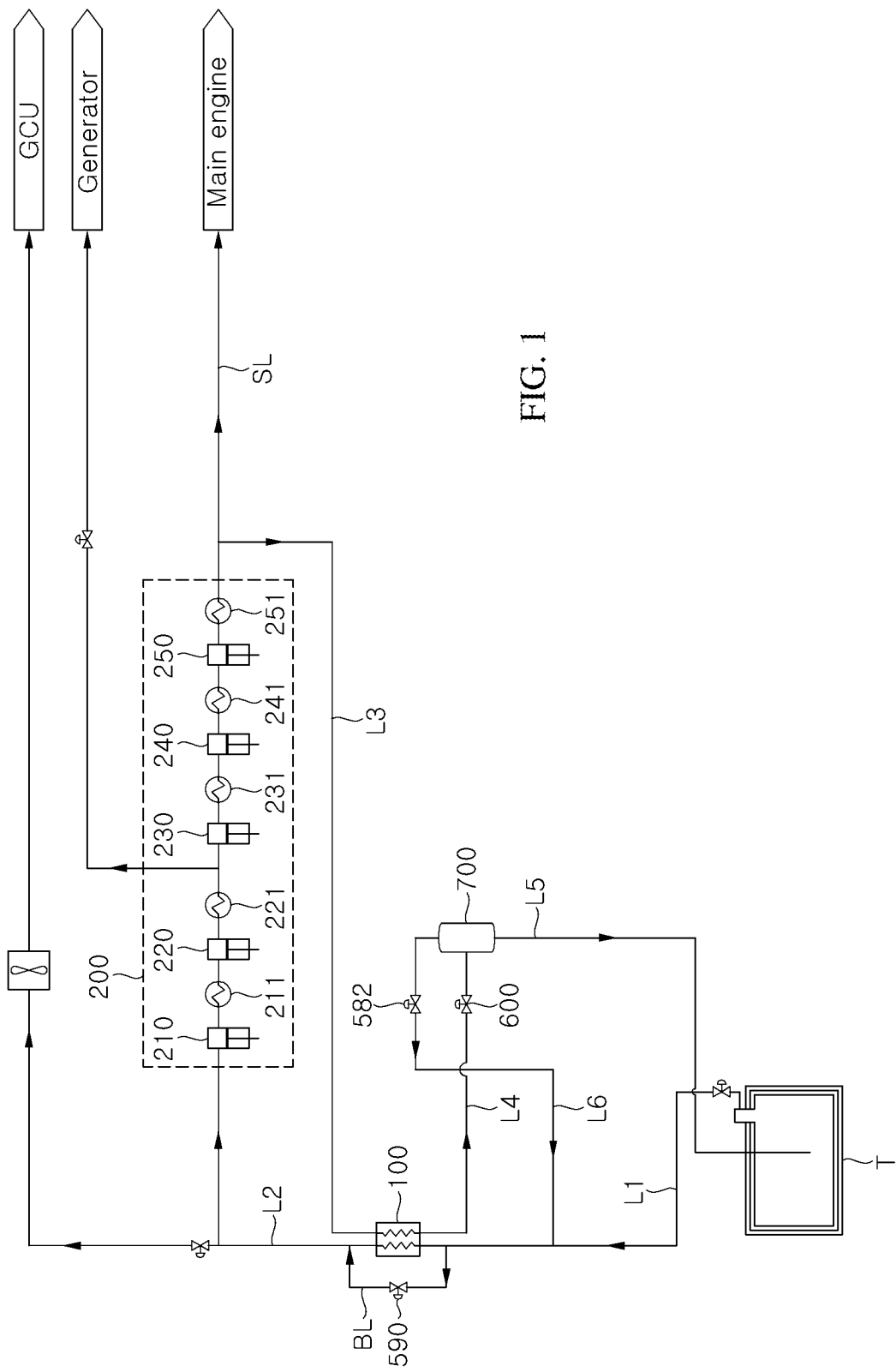
FIG. 1 is a schematic diagram of a BOG reliquefaction system according to a first embodiment of the present invention.

FIG. 1 is a schematic diagram of a BOG reliquefaction system according to a first embodiment of the present invention.

Referring to FIG. 1, the BOG reliquefaction system according to this embodiment includes a compressor 200, a heat exchanger 100, a pressure reducer 600, a bypass line BL, and a bypass valve 590.

The compressor 200 compresses BOG discharged from a storage tank T and may include a plurality of cylinders 210, 220, 230, 240, 250 and a plurality of coolers 211, 221, 231, 241, 251. The BOG compressed by the compressor 200 may have a pressure of about 150 bar to 350 bar.

Some BOG compressed by the compressor 200 may be supplied to a main engine of a vessel along a fuel supply line SL, and the other BOG not to be used by the main engine may be supplied to the heat exchanger 100 along a third supply line L3 so as to be subject to a reliquefaction process. The main engine may be an ME-GI engine that uses high pressure natural gas having a pressure of about 300 bar as fuel.

Some BOG having passed through some cylinders 210, 220 among the cylinders of the compressor 200 is divided and supplied to a generator. The generator according to this embodiment may be a DF engine that uses low pressure natural gas having a pressure of about 6.5 bar as fuel.

The heat exchanger 100 cools the BOG compressed by the compressor 200 and supplied along the third supply line L3 through heat exchange using the BOG discharged from the storage tank T and supplied along a first supply line L1 as a refrigerant. The BOG used as the refrigerant in the heat exchanger 100 is sent to the compressor 200 along the second supply line L2, and the fluid cooled by the heat exchanger 100 is supplied to the pressure reducer 600 along a fourth supply line L4.

The pressure reducer 600 reduces the pressure of the BOG compressed by the compressor 200 and then cooled by the heat exchanger 100. Part or all of the BOG is re-liquefied through compression by the compressor 200, cooling by the heat exchanger 100, and pressure reduction by the pressure reducer 600. The pressure reducer 600 may be an expansion valve, such as a Joule-Thomson valve, or may be an inflator.

The BOG reliquefaction system according to this embodiment may further include a gas/liquid separator 700 disposed at the back of the pressure reducer 600 to separate the BOG remaining in a vapor phase from liquefied natural gas generated by reliquefaction of the BOG through the compressor 200, the heat exchanger 100, and the pressure reducer 600.

The liquefied gas separated by the gas/liquid separator 700 is supplied to the storage tank T along a fifth supply line L5, and the BOG separated by the gas/liquid separator 700 may be combined with the BOG discharged from the storage tank T and be supplied to the heat exchanger 100.

A ninth valve 582 for regulating the flow rate and opening/closing of the corresponding supply line may be disposed on a sixth supply line L6 through which the BOG having a vapor phase is discharged from the gas/liquid separator 700.

If the heat exchanger 100 is not available, for example, upon overhaul or failure of the heat exchanger 100, the BOG discharged from the storage tank T may be allowed to bypass the heat exchanger 100 through the bypass line BL. The bypass line BL is provided with the bypass valve 590 that opens and closes the bypass line BL.

Figure 2:
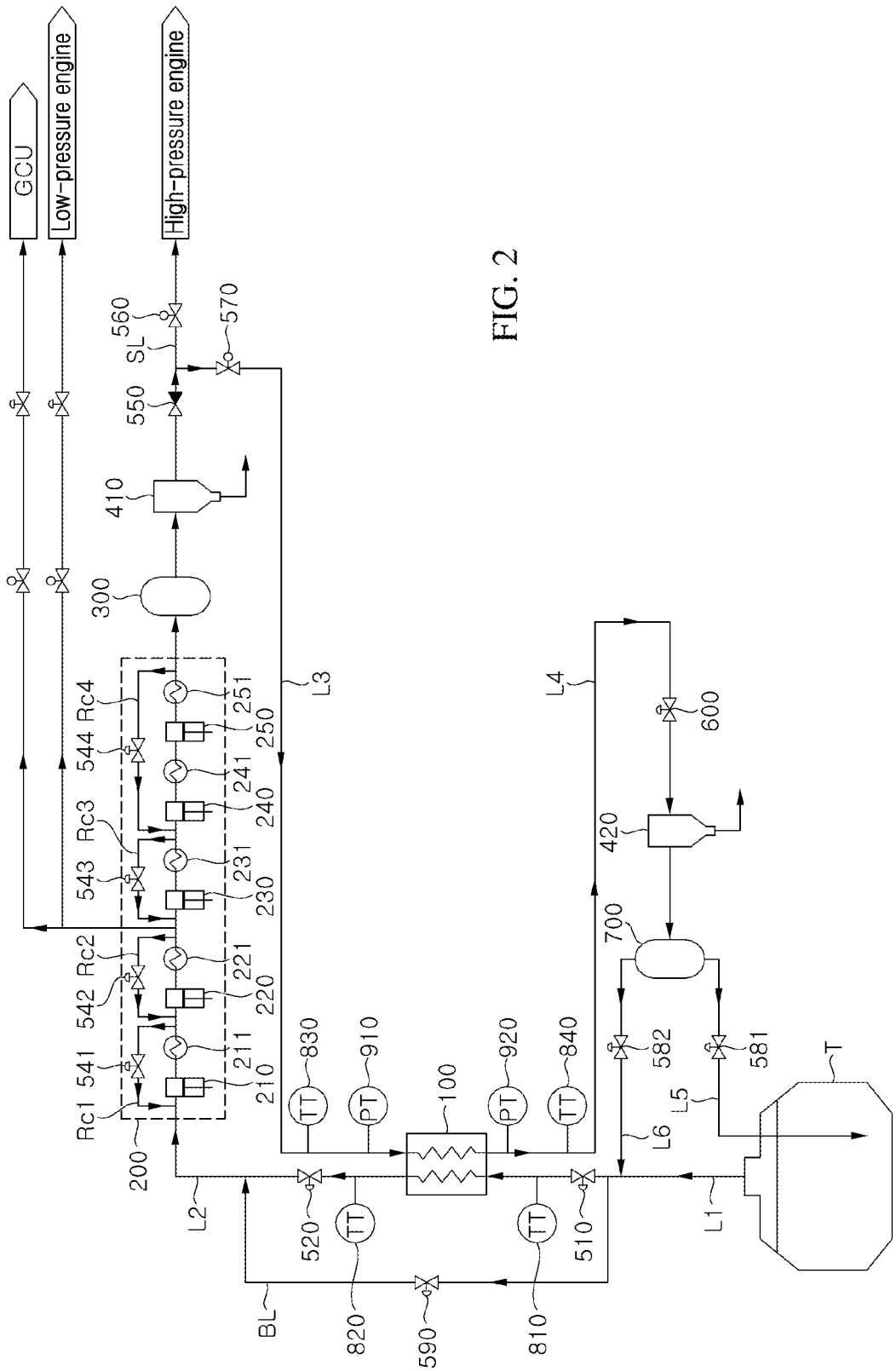
FIG. 2 is a schematic diagram of a BOG reliquefaction system according to a second embodiment of the present invention.

FIG. 2 is a schematic diagram of a BOG reliquefaction system according to a second embodiment of the present invention.

Referring to FIG. 2, the BOG reliquefaction system according to this embodiment includes a heat exchanger 100, a first valve 510, a second valve 520, a first temperature sensor 810, a second temperature sensor 820, a compressor 200, a third temperature sensor 830, a fourth temperature sensor 840, a first pressure sensor 910, a second pressure sensor 920, a pressure reducer 600, a bypass line BL, and a bypass valve 590.

The heat exchanger 100 cools the BOG compressed by the compressor 200 through heat exchange using the BOG discharged from the storage tank T as a refrigerant. The BOG discharged from the storage tank T and used as the refrigerant in the heat exchanger 100 is sent to the compressor 200, and the BOG compressed by the compressor 200 is cooled by the heat exchanger 100 using the BOG discharged from the storage tank T as the refrigerant.

The BOG discharged from the storage tank T is supplied to the heat exchanger 100 along a first supply line L1 and used as the refrigerant, and the BOG used as the refrigerant in the heat exchanger 100 is sent to the compressor 200 along a second supply line L2. Part or all of the BOG compressed by the compressor 200 is supplied to the heat exchanger 100 along a third supply line L3 so as to be cooled, and the fluid cooled by the heat exchanger 100 is supplied to the pressure reducer 600 along a fourth supply line L4.

The first valve 510 is disposed on the first supply line L1 to regulate the flow rate and opening/closing of the corresponding supply line, and the second valve 520 is disposed on the second supply line L2 to regulate the flow rate and opening/closing of the corresponding supply line.

The first temperature sensor 810 is disposed in front of the heat exchanger 100 on the first supply line L1 to measure the temperature of the BOG discharged from the storage tank T and supplied to the heat exchanger 100. Preferably, the first temperature sensor 810 is disposed immediately in front of the heat exchanger 100 to measure the temperature of the BOG immediately before being supplied to the heat exchanger 100.

Herein, the term "in front of" means upstream and the term "at the back of" means downstream.

The second temperature sensor 820 is disposed downstream of the heat exchanger 100 on the second supply line L2 to measure the temperature of the BOG used as the refrigerant in the heat exchanger 100 after being discharged from the storage tank T. Preferably, the second temperature sensor 820 is disposed immediately at the back of the heat exchanger 100 to measure the temperature of the BOG immediately after being used as the refrigerant in the heat exchanger 100.

The compressor 200 compresses the BOG used as the refrigerant in the heat exchanger 100 after being discharged from the storage tank T. The BOG compressed by the compressor 200 may be supplied into a high-pressure engine to be used as fuel, and the remaining BOG after being supplied into the high-pressure engine may be supplied to the heat exchanger 100 for reliquefaction.

A sixth valve 560 for regulating the flow rate and opening/closing of the corresponding supply line may be disposed on the fuel supply line SL through which the BOG compressed by the compressor 200 is supplied to the high-pressure engine.

The sixth valve 560 acts as a safety device to shut off supply of the BOG to the high-pressure engine upon interruption of a gas mode operation of the high-pressure engine. The gas mode means a mode in which the engine is operated using natural gas as fuel. When the BOG to be used as the fuel is insufficient, the engine is switched to a fuel oil mode to allow fuel oil to be used as fuel for the engine.

A seventh valve 570 for regulating the flow rate and opening/closing of the corresponding supply line may be disposed on a supply line through which the surplus BOG above fuel requirement of the high-pressure engine among the BOG compressed by the compressor 200 is supplied to the heat exchanger 100.

When the BOG compressed by the compressor 200 is supplied to the high-pressure engine, the compressor 200 can compress the BOG to a pressure required by the high-pressure engine. The high-pressure engine may be an ME-GI engine that uses high pressure BOG as fuel.

The ME-GI engine is known to use, as fuel, natural gas having a pressure of about 150 bar to 400 bar, preferably about 150 bar to about 350 bar, more preferably about 300 bar. The compressor 200 can compress the BOG to a pressure of about 150 bar to about 350 bar in order to supply the compressed BOG to the ME-GI engine.

Instead of the ME-GI engine as the main engine, an X-DF engine or a DF engine using BOG as fuel at a pressure of about 6 bar to about 20 bar may be used. In this case, since the compressed BOG for supply to the main engine has a low pressure, the compressed BOG to be supplied to the main engine may be further compressed to reliquefy the BOG. The further compressed BOG for re-liquefaction may have a pressure of about 80 bar to 250 bar.

Figure 11:
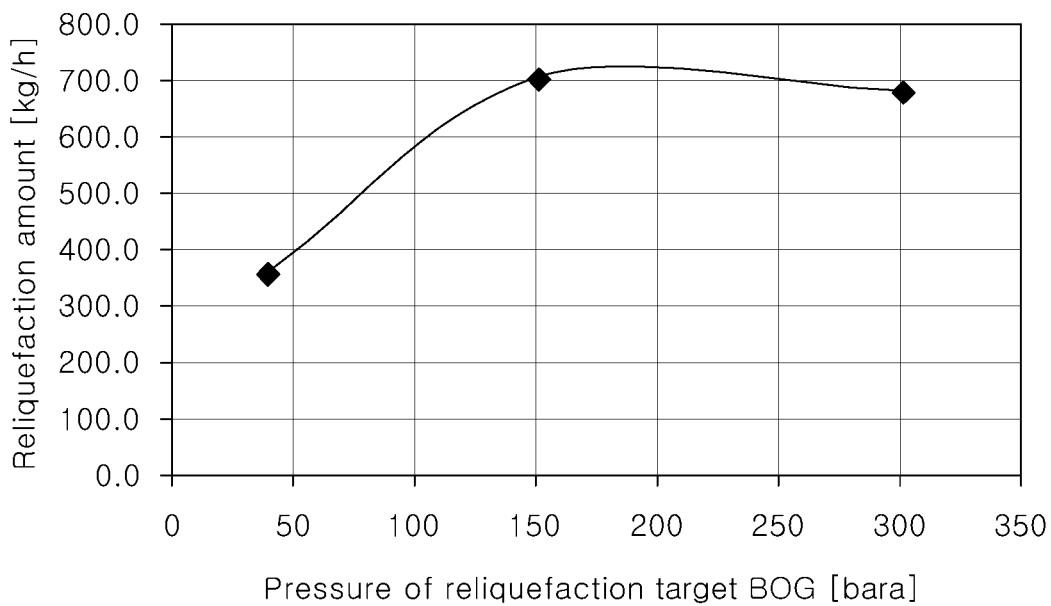
FIG. 11 and FIG. 12 are graphs depicting reliquefaction amounts depending upon BOG pressure in a partial reliquefaction system (PRS).
Figure 12:
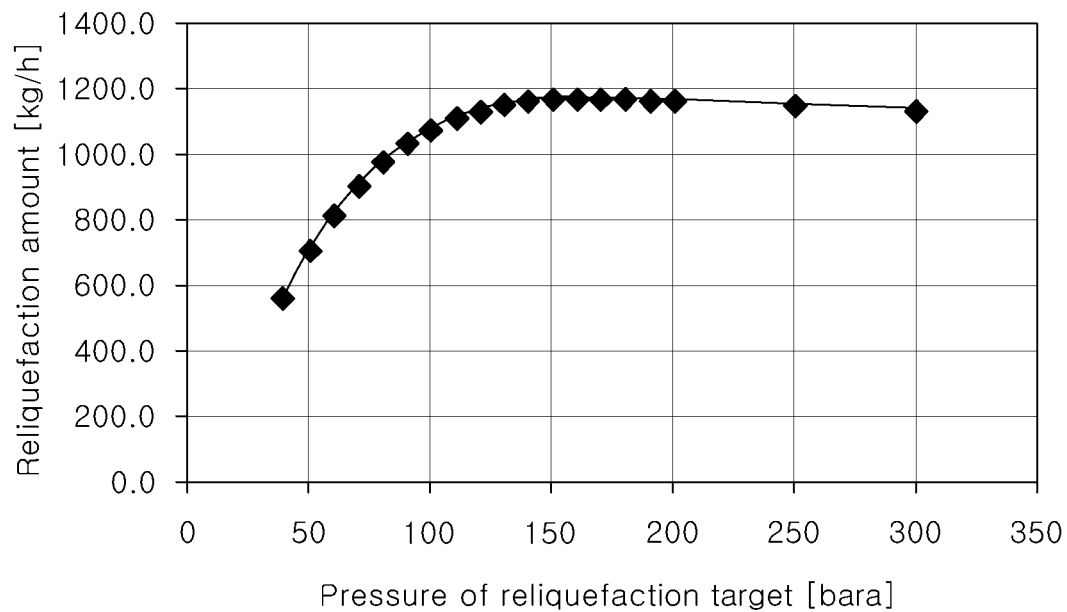

FIG. 11 and FIG. 12 are graphs depicting reliquefaction amounts depending upon BOG pressure in a partial reliquefaction system (PRS). A reliquefaction target BOG means BOG to be re-liquefied though cooling and is distinguished from BOG used as a refrigerant.

Referring to FIG. 11 and FIG. 12, it can be seen that, when the pressure of the BOG is in the range of 150 bar to 170 bar, the reliquefaction amount reaches a maximum value, and when the pressure of the BOG is in the range of 150 bar to 300 bar, there is substantially no change in reliquefaction amount. Accordingly, as the high-pressure engine, the ME-GI engine using BOG having a pressure of about 150 bar to about 350 bar (mainly 300 bar) as fuel can easily control the reliquefaction system to supply fuel to the high-pressure engine while maintaining a high liquefaction amount.

The compressor 200 may include a plurality of cylinders 210, 220, 230, 240, 250, and a plurality of coolers 211, 221, 231, 241, 251 disposed downstream of the plurality of cylinders 210, 220, 230, 240, 250, respectively. The coolers 211, 221, 231, 241, 251 cool BOG compressed by the cylinders 210, 220, 230, 240, 250 and having high pressure and temperature.

In the structure wherein the compressor 200 includes the plurality of cylinders 210, 220, 230, 240, 250, the BOG sent to the compressor 200 is compressed through multiple stages by the plurality of cylinders 210, 220, 230, 240, 250. Each of the cylinders 210, 220, 230, 240, 250 can act as a compression terminal of each of the compressor 200.

The compressor 200 may include a first recirculation line Rc1 through which part or all of the BOG having passed through a first cylinder 210 and a first cooler 211 is supplied to a front end of the first cylinder 210; a second recirculation line Rc2 through which part or all of the BOG having passed through a second cylinder 220 and a second cooler 221 is supplied to a front end of the second cylinder 220; a third recirculation line Rc3 through which part or all of the BOG having passed through a third cylinder 230 and a third cooler 231 is supplied to a front end of the third cylinder 230; and a fourth recirculation line Rc4 through which part or all of the BOG having passed through a fourth cylinder 240, a fourth cooler 241, a fifth cylinder 250 and a fifth cooler 251 is supplied to a front end of the fourth cylinder 240.

In addition, a first recirculation valve 541 for regulating the flow rate and opening/closing of the corresponding supply line may be disposed on the first recirculation line Rc1, a second recirculation valve 542 for regulating the flow rate and opening/closing of the corresponding supply line may be disposed on the second recirculation line Rc2, a third recirculation valve 543 for regulating the flow rate and opening/closing of the corresponding supply line may be disposed on the third recirculation line Rc3, and a fourth recirculation valve 544 for regulating the flow rate and opening/closing of the corresponding supply line may be disposed on the fourth recirculation line Rc4.

The recirculation lines Rc1, Rc2, Rc3, Rc4 protect the compressor 200 by recirculating part or all of the BOG when the storage tank T has a low pressure to satisfy an intake pressure condition required by the compressor 200. When the recirculation lines Rc1, Rc2, Rc3, Rc4 are not used, the recirculation valves 541, 542, 543, 544 are closed, and when the intake pressure condition required by the compressor 200 is not satisfied and the recirculation lines Rc1, Rc2, Rc3, Rc4 are required to be used, the recirculation valves 541, 542, 543, 544 are opened.

Although FIG. 2 shows the structure wherein the BOG having passed through all of the plurality of cylinders 210, 220, 230, 240, 250 of the compressor 200 is supplied to the heat exchanger 100, the BOG having passed through some of the cylinders 210, 220, 230, 240, 250 may be divided in the compressor 200 to be supplied to the heat exchanger 100.

In addition, the BOG having passed through some of the cylinders 210, 220, 230, 240, 250 may be divided in the compressor 200 to be supplied to a low-pressure engine so as to be used as fuel, and the surplus may be supplied to a gas combustion unit (GCU) so as to be combusted.

The low-pressure engine may be a DF engine (for example, DFDE) using BOG having a pressure of about 6 bar to 10 bar as fuel.

Some of the cylinders 210, 220, 230, 240, 250 included in the compressor 200 may operate in an oil-free lubrication manner and the other may operate in an oil lubrication manner. In particular, when the BOG is compressed to 80 bar or more, preferably 100 bar or more, in order to use the BOG compressed by the compressor 200 as fuel for a high-pressure engine or for reliquefaction efficiency, the compressor 200 includes an oil-lubrication type cylinder in order to compress the BOG to high pressure.

In the related art, lubricant oil for lubrication and cooling is supplied to the reciprocation type compressor 200, for example, a piston sealing part thereof, in order to compress the BOG to 100 bar or more.

Since the lubricant oil is supplied to the oil-lubrication type cylinder, some lubricant oil is mixed with the BOG having passed through the oil-lubrication type cylinder in the related art. The inventors of the present invention found that that the lubricant oil mixed with the compressed BOG is condensed or solidified prior to the BOG in the heat exchanger 100 to clog the fluid channel of the heat exchanger 100.

The BOG reliquefaction system according to this embodiment may further include an oil separator 300 and a first oil filter 410 disposed between the compressor 200 and the heat exchanger 100 to separate the oil from the BOG.

The oil separator 300 generally separates the lubricant oil in a liquid phase, and the first oil filter 410 separates the lubricant oil in a vapor phase or in a mist phase. Since the oil separator 300 separates the lubricant oil having a larger particle size than the lubricant oil separated by the first oil filter 410, the oil separator 300 is disposed upstream of the first oil filter 410 such that the BOG compressed by the compressor 200 can be supplied to the heat exchanger 100 after sequentially passing through the oil separator 300 and the first oil filter 410.

Although FIG. 2 shows the structure wherein the BOG reliquefaction system includes both the oil separator 300 and the first oil filter 410, the BOG reliquefaction system according to this embodiment may include one of the oil separator 300 and the first oil filter 410. Preferably, both the oil separator 300 and the first oil filter 410 are used.

In addition, although FIG. 2 shows the structure wherein the first oil filter 410 is provided to the second supply line L2 downstream of the compressor 200, the first oil filter 410 may also be provided to the third supply line L3 upstream of the heat exchanger 100 and may be provided in plural so as to be arranged in parallel.

In the structure wherein the BOG reliquefaction system includes one of the oil separator 300 and the first oil filter 410 and the compressor 200 includes the oil-free lubrication type cylinder and the oil-lubrication type cylinder, the BOG having passed through the oil-lubrication type cylinder may be supplied to the oil separator 300 and/or the first oil filter 410, and the BOG having passed only through the oil-free lubrication type cylinder may be directly supplied to the heat exchanger 100 without passing through the oil separator 300 or the first oil filter 410.

By way of example, the compressor 200 according to this embodiment includes five cylinders 210, 220, 230, 240, 250, in which front three cylinders 210, 220, 230 may be oil-free lubrication type cylinders and rear two cylinders 240, 250 may be oil-lubrication type cylinders. Here, in the BOG reliquefaction system according to this embodiment, the BOG may be directly supplied to the heat exchanger 100 without passing through the oil separator 300 or the first oil filter 410 upon division of the BOG in three stages or less and may be supplied to the heat exchanger 100 after passing through the oil separator 300 and/or the first oil filter 410 upon division of the BOG in four stages or more.

The first oil filter 410 may be a coalescer oil filter.

A check valve 550 may be disposed on the fuel supply line SL between the compressor 200 and the high-pressure engine. The check valve 550 serves to prevent the BOG from returning to and damaging the compressor if the high-pressure engine is stopped.

In the structure wherein the BOG reliquefaction system includes the oil separator 300 and/or the first oil filter 410, the check valve 550 may be disposed downstream of the oil separator 300 and/or the first oil filter 410 in order to prevent the BOG from flowing back to the oil separator 300 and/or the first oil filter 410.

In addition, since the BOG can flow back to the compressor 200 and damage the compressor 200 when an expansion valve 600 is suddenly closed, the check valve 550 may be disposed upstream of a branch point of the third supply line L3 branched from the fuel supply line SL.

The third temperature sensor 830 is disposed upstream of the heat exchanger 100 on the third supply line L3 to measure the temperature of the BOG compressed by the compressor 200 and then supplied to the heat exchanger 100. Preferably, the third temperature sensor 830 is disposed immediately in front of the heat exchanger 100 to measure the temperature of the BOG immediately before being supplied to the heat exchanger 100.

The fourth temperature sensor 840 is disposed downstream of the heat exchanger 100 on the fourth supply line L4 to measure the temperature of the BOG compressed by the compressor 200 and then cooled by the heat exchanger 100. Preferably, the fourth temperature sensor 840 is disposed immediately at the back of the heat exchanger 100 to measure the temperature of the BOG immediately after being cooled by the heat exchanger 100.

The first pressure sensor 910 is disposed upstream of the heat exchanger 100 on the third supply line L3 to measure the pressure of the BOG compressed by the compressor 200 and supplied to the heat exchanger 100. Preferably, the first pressure sensor 910 is disposed immediately in front of the heat exchanger 100 to measure the pressure of the BOG immediately before being supplied to the heat exchanger 100.

The second pressure sensor 920 is disposed downstream of the heat exchanger 100 on the fourth supply line L4 to measure the pressure of the BOG compressed by the compressor 200 and then cooled by the heat exchanger 100. Preferably, the second pressure sensor 920 is disposed immediately at the back of the heat exchanger 100 to measure the pressure of the BOG immediately after being cooled by the heat exchanger 100.

As shown in FIG. 2, although it is desirable that all of the first to fourth temperature sensors 810 to 840, the first pressure sensor 910, and the second pressure sensor 920 be provided to the reliquefaction system, it should be understood that the present invention is not limited thereto. Alternatively, the reliquefaction system may be provided with only the first temperature sensor 810 and the fourth temperature sensor 840 ('first pair'), only the second temperature sensor 820 and the third temperature sensor 830 ('second pair'), only the first pressure sensor 910 and the second pressure sensor 920 ('third pair'), or two pairs among the first to third pairs.

The pressure reducer 600 is disposed downstream of the heat exchanger 100 to decompress the BOG compressed by the compressor 200 and then cooled by the heat exchanger 100. Part or all of the BOG is re-liquefied through compression by the compressor 200, cooling by the heat exchanger 100, and pressure reduction by the pressure reducer 600. The pressure reducer 600 may be an expansion valve, such as a Joule-Thomson valve, or may be an inflator.

The BOG reliquefaction system according to this embodiment may further include a gas/liquid separator 700 disposed downstream of the pressure reducer 600 to separate the BOG remaining in a vapor phase from liquefied natural gas generated by reliquefaction of the BOG through the compressor 200, the heat exchanger 100, and the pressure reducer 600.

The liquefied gas separated by the gas/liquid separator 700 is supplied to the storage tank T along the fifth supply line L5, and the BOG separated by the gas/liquid separator 700 may be combined with the BOG discharged from the storage tank T along the sixth supply line L6 and be supplied to the heat exchanger 100.

Although FIG. 2 shows the structure wherein the BOG separated by the gas/liquid separator 700 is combined with the BOG discharged from the storage tank T and then supplied to the heat exchanger 100, it should be understood that the present invention is not limited thereto. By way of example, the heat exchanger 100 may be composed of three fluid channels and the BOG separated by the gas/liquid separator 700 may be supplied to the heat exchanger 100 along a separate fluid channel so as to be used as a refrigerant therein.

Alternatively, the gas/liquid separator 700 may be omitted and the BOG reliquefaction system may be configured to allow the fluid partially or totally re-liquefied through pressure reduction by the pressure reducer 600 to be directly supplied to the storage tank T.

An eighth valve 581 for regulating the flow rate and opening/closing of the corresponding supply line may be disposed on the fifth supply line L5. A level of the liquefied gas in the gas/liquid separator 700 is regulated by the eighth valve 581.

A ninth valve 592 for regulating the flow rate and opening/closing of the corresponding supply line may be disposed on the sixth supply line L6. Internal pressure of the gas/liquid separator 700 can be regulated by the ninth valve 592.

Figure 4:
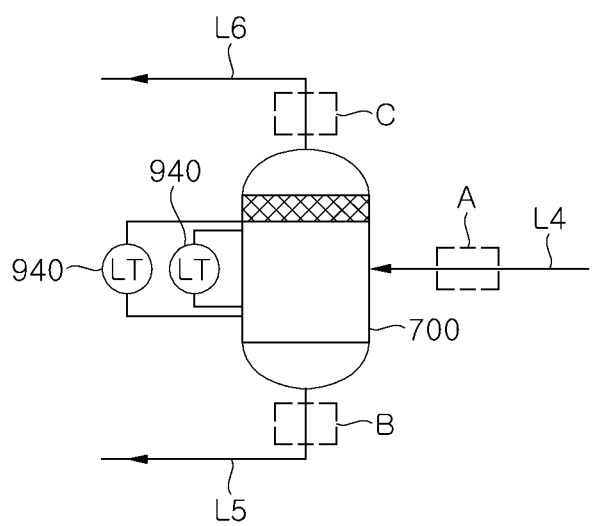
FIG. 4 is an enlarged view of a gas/liquid separator according to one embodiment of the present invention.

FIG. 4 is an enlarged view of a gas/liquid separator according to one embodiment of the present invention. Referring to FIG. 4, the gas/liquid separator 700 may be provided with a fluid level sensor 940 that measures the level of natural gas in the gas/liquid separator 700.

The BOG reliquefaction system according to this embodiment may include a second oil filter 420 disposed between the pressure reduce 600 and the gas/liquid separator 700 to filter the lubricant oil mixed with the fluid subjected to pressure reduction by the pressure reducer 600.

Referring to FIG. 2 and FIG. 4, the second oil filter 420 may be disposed on the fourth supply line L4 between the pressure reducer 600 and the gas/liquid separator 700 (Position A in FIG. 4), on the fifth supply line L5 through which the re-liquefied gas is discharged from the gas/liquid separator 700 (Position B in FIG. 4), or on the sixth supply line L6 through which the gaseous BOG is discharged from the gas/liquid separator 700 (Position C in FIG. 4). FIG. 2 shows the structure wherein the second oil filter 420 is disposed at Position A in FIG. 4.

The BOG separated by the gas/liquid separator 700 may be combined with the BOG discharged from the storage tank T and be supplied to a cold fluid channel of the heat exchanger 100. Here, since the lubricant oil is collected in the gas/liquid separator 700, there is a possibility that even a small amount of the lubricant oil can be mixed with the gaseous BOG separated by the gas/liquid separator 700.

The inventors of the present invention found that, when the gaseous BOG separated by the gas/liquid separator 700 is mixed with the lubricant oil and sent to the cold fluid channel of the heat exchanger 100, more difficult circumstances can occur than the case where the lubricant oil mixed with the BOG compressed by the compressor 200 is supplied to a hot fluid channel of the heat exchanger 100.

Since a fluid to be used as a refrigerant in the heat exchanger 100 is sent to the cold fluid channel of the heat exchanger 100, cryogenic BOG is supplied throughout operation of the reliquefaction system and a fluid having a high enough temperature to melt the condensed or solidified oil is not supplied thereto. Therefore, it is very difficult to remove the condensed or solidified oil accumulated in the low-temperature fluid channel of the heat exchanger 100.

In order to reduce the possibility of supplying the mixture of the lubricant oil and the gaseous BOG separated by the gas/liquid separator 700 to the cold fluid channel of the heat exchanger 100 as low as possible, the second oil filter 420 may be disposed at Position A or C in FIG. 4.

In the structure wherein the second oil filter 420 is disposed at Position C in FIG. 4, since most of the molten or viscosity-reduced lubricant oil is collected in a liquid phase in the gas/liquid separator 700 and the amount of gaseous lubricant oil discharged along the sixth supply line L6 is small, there are advantages in that the reliquefaction system has high filtering efficiency and does not require frequent replacement of the second oil filter 420.

In the structure wherein the second oil filter 420 is disposed at Position B in FIG. 4, since the lubricant oil can be prevented from flowing into the storage tank T, it is possible to prevent contamination of the liquefied gas stored in the storage tank T.

Since the first oil filter 410 is disposed downstream of the compressor 200 and the BOG compressed by the compressor 200 has a temperature of about 40° C. to about 45° C., it is not necessary to use a cryogenic oil filter. However, since the fluid reduced in pressure by the pressure reducer 600 has a temperature of about −160° C. to about −150° C. to allow reliquefaction of at least part of the BOG, and since the liquefied gas and the BOG separated by the gas/liquid separator 700 have a temperature of about −160° C. to about −150° C., the second oil filter 420 must be designed for cryogenic temperatures regardless of the position of the second oil filter 420 among the positions A, B, C and D in FIG. 4.

In addition, since most lubricant oil mixed with the BOG compressed by the compressor 200 and having a temperature of about 40° C. to 45° C. has a liquid phase or a mist phase, the oil separator 300 is designed to be suitable for separation of the lubricant oil of the liquid phase and the first oil filter 410 is designed to be suitable for separating the lubricant oil of the mist phase, (which may include some lubricant oil in a vapor phase).

Conversely, the fluid, which is a cryogenic fluid and reduced in pressure by the pressure reducer 600, the BOG separated by the gas/liquid separator 700, and the lubricant oil mixed with the liquefied gas separated by the gas/liquid separator 700 in a solid phase (or in a solidified state) below a flow point, the second oil filter 420 is designed to be suitable for separation of the lubricant oil in the solid phase (or in the solidified state).

Figure 5:
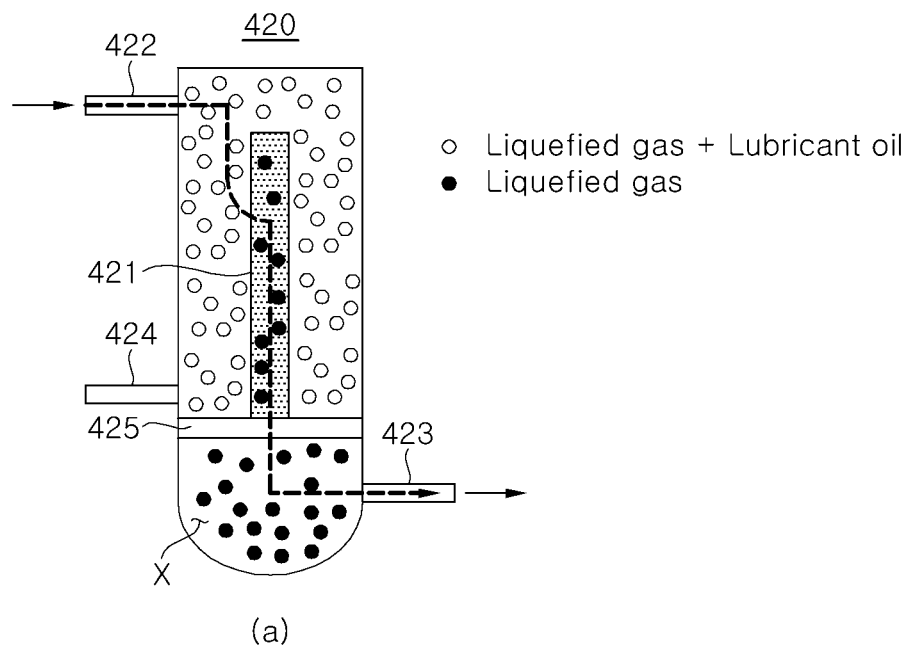
FIG. 5 provides enlarged views of a second oil filter according to one embodiment of the present invention.
Figure 5:
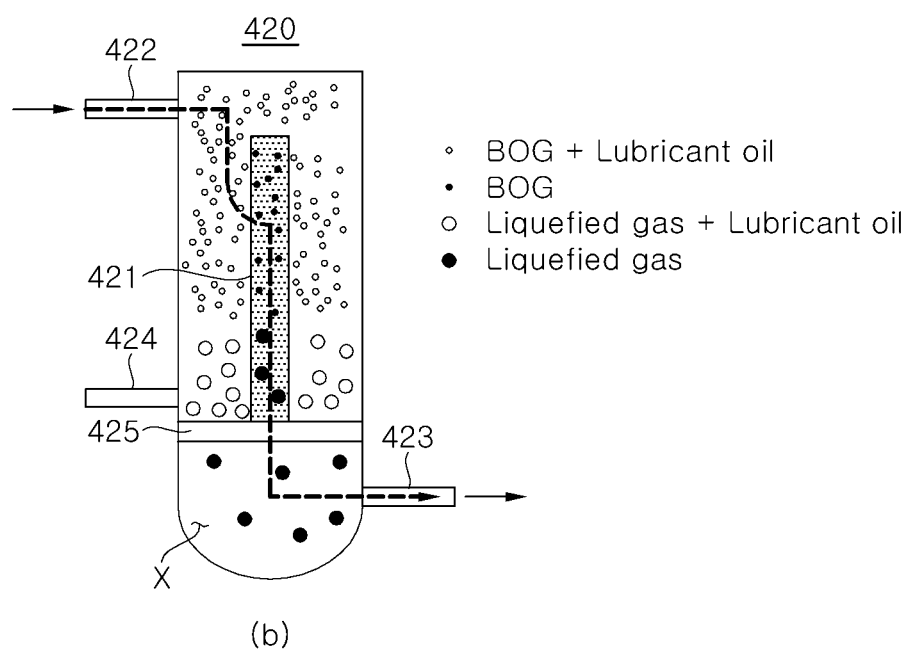
Figure 6:
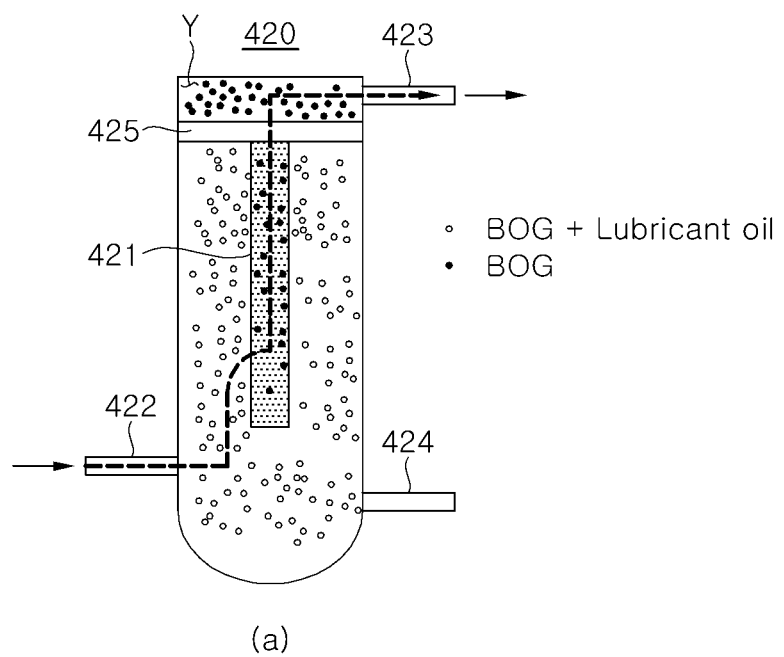
FIG. 6 provides enlarged views of a second oil filter according to another embodiment of the present invention.
Figure 6:
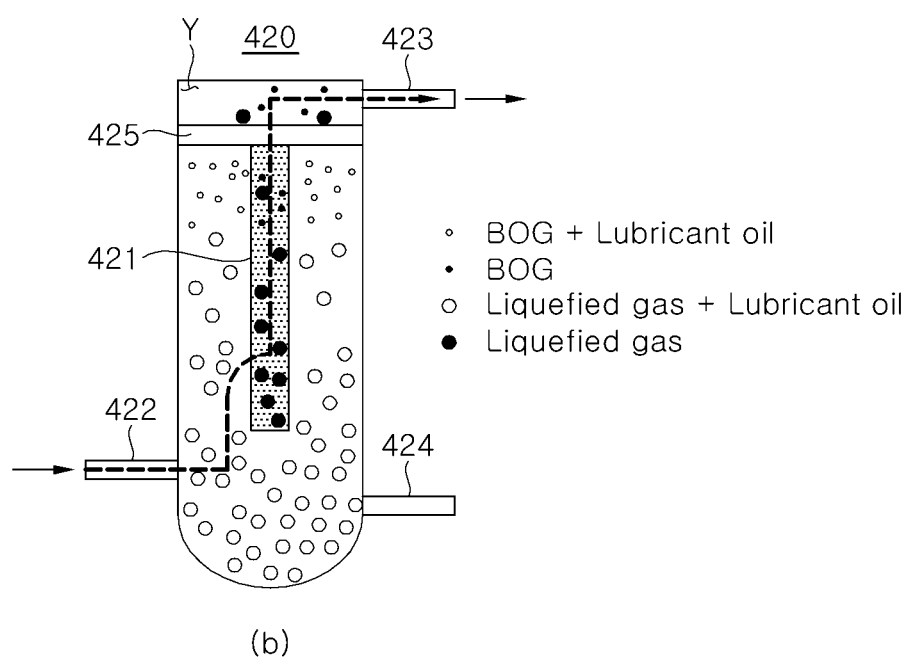

FIG. 5 provides enlarged views of a second oil filter according to one embodiment of the present invention and FIG. 6 provides enlarged views of a second oil filter according to another embodiment of the present invention.

Referring to FIG. 5 and FIG. 6, the second oil filter 420 may have a structure as shown in FIG. 5 (hereinafter, 'downward discharge type') or a structure as shown in FIG. 6 (hereinafter, 'upward discharge type'). In FIG. 5 and FIG. 6, a dotted line indicates a fluid flow direction.

Referring to FIG. 5 and FIG. 6, the second oil filter 420 includes a fixing plate 425 and a filter element 421 and is connected to an inflow pipe 422, a discharge pipe 423 and an oil discharge pipe 424.

The filter element 421 is provided to the fixing plate 425 to separate the lubricant oil from the fluid flowing through the inflow pipe 422.

Figure 13:
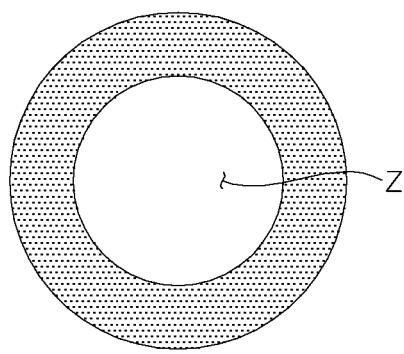
FIG. 13 is a plan view of a filter element shown in FIG. 5 and FIG. 6.

FIG. 13 is a plan view of the filter element 421 shown in FIG. 5 and FIG. 6. Referring to FIG. 13, the filter element 421 may have a hollow (Z space in FIG. 13) cylindrical shape, in which multiple layers having different meshes are stacked one above another. The lubricant oil is filtered from the fluid while the fluid flowing into the second oil filter 420 through the inflow pipe 422 passes through the multiple layers of the filter element 421. The filter element 421 may separate the lubricant oil by a physical adsorption method.

The fluid (BOG, liquefied gas, or fluid of a vapor-liquid mixture) filtered by the filter element 421 is discharged through the discharge pipe 423 and the lubricant oil filtered by the filter element 421 is discharged through the oil discharge pipe 424.

The components of the second oil filter 420 are formed of materials capable of enduring cryogenic conditions in order to separate the lubricant oil from the fluid having an extremely low temperature. The filter element 421 may be formed of a metal capable of enduring cryogenic conditions, particularly, SUS.

Referring to FIG. 5, in the downward discharge type oil filter, the fluid supplied through the inflow pipe 422 connected to an upper portion of the oil filter passes through the filter element 421 and a space (X in FIG. 5) defined under the fixing plate 425, and is then discharged through the discharge pipe 423 connected to a lower portion of the oil filter.

In the downward discharge type oil filter, the fixing plate 425 is connected to a lower portion of the oil filter, the filter element 421 is disposed on an upper surface of the fixing plate 425, and the discharge pipe 423 is connected to a side of the oil filter opposite to the filter element 421 with respect to the fixing plate 425.

Further, in the downward discharge type oil filter, the inflow pipe 422 is preferably connected to the oil filter to be disposed above an upper end of the filter element 421 in order to allow the fluid flowing into the oil filter through the inflow pipe 422 to be filtered even by an upper portion of the filter element 421 (that is, in order to use as much of the filter element as possible).

It is desirable that the inflow pipe 422 and the discharge pipe 423 be disposed on opposite sides (on the left and right sides with respect to the filter element 421 in FIG. 5) in terms of fluid flow, and since the lubricant oil filtered by the filter element 421 is collected at a lower side of the oil filter, it is desirable that the oil discharge pipe 424 be connected to the lower portion of the filter element 421.

In the downward discharge type oil filter, the oil discharge pipe 424 may be connected to the oil filter to be disposed immediately above the fixing plate 425.

As shown in (a) of FIG. 5, when a fluid mainly composed of a liquid component (for example, 90 vol % of liquid and 10 vol % of gas) is supplied to the downward discharge type oil filter, a downward flow of the fluid is generated due to a high density of the liquid component, thereby securing good filtering effects.

On the other hand, as shown in (b) of FIG. 5, when a fluid composed of a gaseous component (for example, 10 vol % of liquid and 90 vol % of gas) is supplied to the downward discharge type oil filter, the gaseous component having a small density stays in the upper portion of the oil filter, thereby deteriorating the fluid flow and the filtering effects.

Referring to FIG. 6, in the upward discharge type oil filter, the fluid supplied through the inflow pipe 422 connected to a lower portion of the oil filter passes through the filter element 421 and a space (Y in FIG. 6) defined above the fixing plate 425, and is then discharged through the discharge pipe 423 connected to an upper portion of the oil filter.

In the upward discharge type oil filter, the fixing plate 425 is connected to an upper portion of the oil filter, the filter element 421 is disposed on a lower surface of the fixing plate 425, and the discharge pipe 423 is connected to a side of the oil filter opposite to the filter element 421 with respect to the fixing plate 425.

Further, in the upward discharge type oil filter, the inflow pipe 422 is preferably connected to the oil filter to be disposed below a lower end of the filter element 421 in order to allow the fluid flowing into the oil filter through the inflow pipe 422 to be filtered even by a lower portion of the filter element 421 (that is, in order to use as much of the filter element as possible).

It is desirable that the inflow pipe 422 and the discharge pipe 423 be disposed on opposite sides (on the left and right sides with respect to the filter element 421 in FIG. 6) in terms of fluid flow, and since the lubricant oil filtered by the filter element 421 is collected at the lower side of the oil filter, it is desirable that the oil discharge pipe 424 be connected to the lower portion of the filter element 421.

Referring to FIG. 6, in the upward discharge type oil filter, the fluid supplied to the oil filter through the inflow pipe 422 connected to the lower portion of the oil filter passes through the filter element 421 and is discharged through the discharged pipe 423 connected to the upper portion of the oil filter. The lubricant oil filtered by the filter element 421 is discharged through a separate pipe 424.

As shown in (a) of FIG. 6, when a fluid mainly composed of a gaseous component (for example, 10 vol % of liquid and 90 vol % of gas) is supplied to the upward discharge type oil filter, an upward flow of the fluid is generated due to a low density of the gaseous component, thereby providing a suitable upward flow while securing good filtering effects.

On the other hand, as shown in (b) of FIG. 6, when a fluid composed of a liquid component (for example, 90 vol % of liquid and 10 vol % of gas) is supplied to the upward discharge type oil filter, the liquid component having a high density stays in the lower portion of the oil filter, thereby deteriorating fluid flow and filtering effects.

Accordingly, in the structure wherein the second oil filter 420 is disposed at Position B of FIG. 4, it is desirable that the downward discharge type oil filter as shown in FIG. 5 be used as the second oil filter 420, and when the second oil filter 420 is disposed at Position C of FIG. 4, it is desirable that the upward discharge type oil filter as shown in FIG. 6 be used as the second oil filter 420.

In the structure wherein the second oil filter 420 is disposed at Position A in FIG. 4, the fluid reduced in pressure by the pressure reducer 600 is a vapor-liquid mixture (theoretically 100% reliquefaction is possible) in which the volume ratio of the gas component is higher than the volume ratio of the liquid component. Thus, it is desirable that the upward discharge type oil filter as shown in FIG. be used as the second oil filter 420.

According to the embodiments, the bypass line BL is branched from the first supply line L1 upstream of the heat exchanger 100 to bypass the heat exchanger 100 and is joined to the second supply line L2 downstream of the heat exchanger 100.

Typically, the bypass line bypassing the heat exchanger is disposed inside the heat exchanger to be integrated with the heat exchanger. In the structure wherein the bypass line is disposed inside the heat exchanger, the fluid cannot be supplied to the heat exchanger and the bypass line when the valves disposed upstream and/or downstream of the heat exchanger are closed.

In the embodiments of the invention, the bypass line BL is disposed outside the heat exchanger 100 to be separate from the heat exchanger 100 and is branched from the first supply line L1 upstream of the first valve 510 and joined to the second supply line L2 downstream of the second valve 520 such that the BOG can be sent to the bypass line BL even when the first valve 510 upstream of the heat exchanger 100 and/or the second valve 520 downstream of the heat exchanger 100 are closed.

The bypass valve 590 is disposed on the bypass line BL and is opened when there is a need for use of the bypass line BL.

Fundamentally, when the heat exchanger 100 cannot be used, for example, when the heat exchanger 100 fails or is overhauled, the bypass line BL will be used. For example, if the heat exchanger 100 cannot be used when the BOG reliquefaction system according to this embodiment sends part or all of the BOG compressed by the compressor 200 to the high-pressure engine, the BOG discharged from the storage tank T is directly sent to the compressor 200 along the bypass line BL bypassing the heat exchanger 100, instead of reliquefying the surplus BOG not used by the high-pressure engine, and the BOG compressed by the compressor 200 is supplied to the high-pressure engine while sending the surplus BOG to the GCU to burn the surplus BOG.

In use of the bypass line BL for overhaul of the heat exchanger 100, for example, when the fluid channel of the heat exchanger 100 is clogged by the condensed or solidified lubricant oil, the condensed or solidified lubricant oil can be removed through the bypass line BL.

In addition, if there is no need for reliquefaction of the BOG due to little surplus BOG as in a ballast condition of the vessel, all of the BOG discharged from the storage tank T may be sent to the bypass line BL so as to allow all of the BOG to be directly sent to the compressor 200 while bypassing the heat exchanger 100. The BOG compressed by the compressor 200 is used as fuel for the high-pressure engine. If it is determined that there is no need for reliquefaction of the BOG due to little surplus BOG, the bypass valve 590 may be controlled to be automatically opened.

The inventors of the present invention found that, when the BOG is supplied to the engine through the heat exchanger having a narrow fluid channel according to the embodiments, the BOG suffers from a severe pressure drop due to the heat exchanger. If there is no need for reliquefaction of the BOG, fuel can be smoothly supplied to the engine by compressing the BOG while bypassing the heat exchanger, as described above.

In addition, the bypass line BL may also be used for reliquefaction of the BOG due to increase in the amount of BOG not re-liquefied.

When there is a need for reliquefaction of the BOG due to increase in the amount of BOG (that is, upon start or restart of BOG reliquefaction), all of the BOG discharged from the storage tank T may be sent to the bypass line BL so as to allow all of the BOG to be directly sent to the compressor 200 while bypassing the heat exchanger 100, and the BOG compressed by the compressor 200 may be sent to the hot fluid channel of the heat exchanger 100. Some of the BOG compressed by the compressor 200 may be supplied to the high-pressure engine.

When the temperature of the hot fluid channel of the heat exchanger 100 is increased through the aforementioned process upon start or restart of BOG reliquefaction, there is an advantage in that BOG reliquefaction can be started after removing any condensed or solidified lubricant oil, other residues or impurities that can remain in the heat exchanger 100, other equipment, pipes, and the like in the previous BOG reliquefaction process.

Residues may include the BOG, which is compressed by the compressor 200 and then supplied to the heat exchanger in the previous BOG liquefaction, and the lubricant oil mixed with the BOG compressed by the compressor 200.

If the cold BOG discharged from the storage tank T is directly supplied to the heat exchanger 100 without increasing the temperature of the heat exchanger 100 through the bypass line BL upon start or restart of BOG reliquefaction, the cold BOG discharged from the storage tank T is sent to the cold fluid channel of the heat exchanger 100 in a state that the hot BOG is not sent to the hot fluid channel of the heat exchanger 100. As a result, the lubricant oil remaining in a non-condensed or non-solidified state in the heat exchanger 100 can also be condensed or solidified as the temperature of the heat exchanger 100 decreases.

When the bypass line BL is used to increase the temperature of the heat exchanger 100 for a certain period of time (if it is determined that the condensed or solidified lubricant oil or other impurities are almost completely removed, the certain period of time can be determined by those skilled in the art and may be about 1 minute to about 30 minutes, preferably about 3 minutes to about 10 minutes, and more preferably about 2 minutes to about 5 minutes), BOG reliquefaction is started by slowly opening the first valve 510 and the second valve 520 while slowly closing the bypass valve 590. As the time further elapses, the first valve 510 and the second valve 520 are completely opened and the bypass valve 590 is completely closed to allow all of the BOG discharged from the storage tank T to be used as a refrigerant for reliquefaction of the BOG in the heat exchanger 100.

In addition, the bypass line BL may be used to satisfy the intake pressure condition of the compressor 200 when the internal pressure of the storage tank T is low.

Furthermore, if the internal pressure of the storage tank T is required to be controlled to a low pressure, the bypass line BL may be used to satisfy the intake pressure condition of the compressor 200 even if the internal pressure of the storage tank T is decreased.

The following description will focus on the case where the bypass line BL is used to remove the condensed or solidified lubricant oil and the case where the bypass line BL is used to satisfy the intake pressure condition of the compressor 200 when the internal pressure of the storage tank T is low.

1. The Case where the Bypass Line BL is Used to Remove Condensed or Solidified Lubricant Oil The inventors of the present invention found that, since a certain amount of lubricant oil is mixed with the BOG having passed through the oil-lubrication type cylinder of the compressor 200 and the lubricant oil contained in the BOG is condensed or solidified prior to the BOG in the heat exchanger 100 and accumulated in the heat exchanger 100, there is a need for removal of the condensed or solidified lubricant oil from the heat exchanger 100 after a predetermined period of time due to increase in amount of the condensed or solidified lubricant oil accumulated in the heat exchanger 100 over time.

Particularly, although it is desirable that the heat exchanger 100 according to this embodiment be a printed circuit heat exchanger (PCHE, also referred to as DCHE) in consideration of pressure and/or flow rate of BOG to be re-liquefied, reliquefaction efficiency, and the like, the PCHE has a narrow serpentine fluid channel (micro-channel type fluid channel) and thus has a problem such as easy clogging of the fluid channel by the condensed or solidified lubricant oil, easy accumulation of the condensed or solidified lubricant oil at a serpentine portion of the fluid channel, and the like. The PCHE (DCHE) is manufactured by Kobelko Co., Ltd., Alfalaval Co., LTd., and the like.

The condensed or solidified lubricant oil can be removed through the steps of:

1) determining whether it is time to remove the condensed or solidified lubricant oil;
2) opening the bypass valve 590 while closing the first valve 510 and the second valve 520;
3) compressing, by the compressor 200, BOG discharged from the storage tank T and having passed through the bypass line BL;
4) sending part or all of the hot BOG compressed by the compressor 200 to the heat exchanger 100;
5) sending the BOG having passed through the heat exchanger 100 to the gas/liquid separator 700;
6) discharging lubricant oil from the gas/liquid separator 700; and
7) determining whether the heat exchanger 100 is normalized 1) The Step of Determining Whether it is Time to Remove the Condensed or Solidified Lubricant Oil When the fluid channel of the heat exchanger 100 is clogged by the condensed or solidified lubricant oil, cooling efficiency of the heat exchanger 100 can be reduced. Therefore, if performance of the heat exchanger 100 falls below a preset value of normal performance, it can be estimated that the condensed or solidified lubricant oil is accumulated in a certain amount or more in the heat exchanger 100. By way of example, it can be determined that it is time to remove the condensed or solidified lubricant oil from the heat exchanger 100 if the performance of the heat exchanger 100 falls to about 50% to about 90% of normal performance, preferably about 60% to about 80%, more preferably about 70% or less.

Herein, the range of "about 50% to about 90%" of normal performance includes all of values of about 50% or less, about 60% or less, about 70% or less, about 80% or less, and about 90% or less, and the range of "about 60% to about 80%" of normal performance include all of values of about 60% or less, about 70% or less, and about 80% or less.

When the performance of the heat exchanger 100 deteriorates, the temperature difference between cold BOG (L1) supplied to the heat exchanger 100 and cold BOG (L4) discharged from the heat exchanger 100 increases, and the temperature difference between hot BOG (L2) discharged from the heat exchanger 100 and hot BOG (L3) supplied to the heat exchanger 100 also increases. In addition, when the fluid channel of the heat exchanger 100 is clogged by the condensed or solidified lubricant oil, the fluid channel of the heat exchanger 100 becomes narrow, thereby increasing the pressure difference between a front end (L3) and a rear end (L4) of the heat exchanger 100.

Accordingly, it is possible to determine whether it is time to remove the condensed or solidified lubricant oil, based on the temperature difference 810, 840 of the cold fluid supplied to the heat exchanger 100 or discharged from the heat exchanger 100, the temperature difference 820, 830 of the hot fluid supplied to the heat exchanger 100 or discharged from the heat exchanger 100, and the pressure difference 910, 920 of the hot fluid channel of the heat exchanger 100.

Specifically, if the temperature difference (meaning an absolute value, hereinafter referred to as "temperature difference of the cold flow") between the temperature of the BOG discharged from the storage tank T and supplied to the heat exchanger 100, as measured by the first temperature sensor 810, and the temperature of the BOG compressed by the compressor 200 and cooled by the heat exchanger 100, as measured by the fourth temperature sensor 840, is higher than a normal temperature difference and continues for a certain period of time or more, it can be determined that heat exchange is normally performed in the heat exchanger 100.

By way of example, when the state wherein the temperature difference of the cold flow is 20° C. to 50° C. or higher, preferably 30° C. to 40° C. or higher, more preferably about 35° C. or higher, continues for 1 hour or more, it can be determined that it is time to discharge the condensed or solidified lubricant oil.

When the heat exchanger 100 is normally operated, the BOG compressed to about 300 bar by the compressor 200 has a temperature of about 40° C. to about 45° C., and the BOG discharged from the storage tank T and having a temperature of about −160° C. to about −140° C. is supplied to the heat exchanger 100. Here, the temperature of the BOG discharged from the storage tank T is increased to about −150° C. to about −110° C., preferably about −120° C., during delivery to the heat exchanger 100.

In the BOG reliquefaction system according to this embodiment that includes the gas/liquid separator 700, when gaseous BOG separated by the gas/liquid separator 700 is combined with the BOG discharged from the storage tank T and is then supplied to the heat exchanger 100, the temperature of the BOG finally supplied to the heat exchanger 100 is lower than that of the BOG discharged from the storage tank T to the heat exchanger 100, and the temperature of the BOG supplied to the heat exchanger 100 can be further lowered with increasing amount of the gaseous BOG separated by the gas/liquid separator 700.

The BOG supplied to the heat exchanger 100 along the third supply line L3 and having a temperature of about 40° C. to 45° C. is cooled to about −130° C. to about −110° C. by the heat exchanger 100, and the temperature difference of the cold flow is preferably about 2° C. to about 3° C. in a normal state.

In addition, if the temperature difference (meaning an absolute value, hereinafter referred to as "temperature difference of the hot flow") between the temperature of the BOG discharged from the storage tank T and used as a refrigerant by the heat exchanger 100, as measured by the second temperature sensor 820, and the temperature of the BOG compressed by the compressor 200 and supplied to the heat exchanger 100, as measured by the third temperature sensor 830, is higher than a normal temperature difference and continues for a certain period of time or more, it can be determined that heat exchange is normally performed in the heat exchanger 100.

When the state wherein the temperature difference of the hot flow is 20° C. to 50° C. or higher, preferably 30° C. to 40° C. or higher, more preferably about 35° C. or higher, continues for 1 hour or more, it can be determined that it is time to discharge the condensed or solidified lubricant oil.

When the heat exchanger 100 is normally operated, the BOG discharged from the storage tank T and having a slightly increased temperature of about −150° C. to about −110° C. (preferably about −120° C.) during delivery to the heat exchanger 100 may have a temperature of about −80° C. to 40° C. depending upon the speed of the vessel after being used as the refrigerant in the heat exchanger 100, and the BOG used as the refrigerant in the heat exchanger 100 and having a temperature of about −80° C. to 40° C. is compressed by the compressor 200 to have a temperature of about 40° C. to about 45° C.

Furthermore, if the pressure difference (hereinafter referred to as "pressure difference of the hot fluid channel") between the pressure of the BOG compressed by the compressor 200 and supplied to the heat exchanger 100, as measured by the first pressure sensor 910, and the pressure of the BOG cooled by the heat exchanger 100, as measured by the second pressure sensor 920, is higher than a normal pressure difference and continues for a certain period of time or more, it can be determined that the heat exchanger 100 is abnormally operated.

Since the BOG discharged from the storage tank T is not mixed with oil or has a trace amount of oil and a time point at which the lubricant oil is mixed with the BOG is when the BOG is compressed by the compressor 200, the condensed or solidified lubricant oil is not substantially accumulated in the cold fluid channel of the heat exchanger 100, which uses the BOG discharged from storage tank T as the refrigerant and then supplies the BOG to the compressor 200, and is accumulated in the hot fluid channel of the heat exchanger 100, in which the BOG compressed by the compressor 200 is cooled and supplied to the pressure reducer 600.

Accordingly, since the pressure difference between the front end and the rear end of the heat exchanger 100 due to blocking of the fluid channel by the condensed or solidified lubricant oil rapidly increases in the hot fluid channel, it is determined whether it is time to remove the condensed or solidified lubricant oil by measuring the pressure of the hot fluid channel of the heat exchanger 100.

Considering that the PCHE having a narrow and serpentine fluid channel can be used as the heat exchanger according to this embodiment, determination as to whether it is time to remove the condensed or solidified lubricant oil based on the pressure difference between the front end and the rear end of the heat exchanger 100 can be advantageously used.

By way of example, when the pressure difference of the hot fluid channel is two or more times a normal pressure difference thereof and continues for 1 hour or more, it can be determined that it is time to discharge the condensed or solidified lubricant oil.

When the heat exchanger 100 is normally operated, the BOG compressed by the compressor 200 undergoes a pressure drop of about 0.5 bar to about 2.5 bar, preferably about 0.7 bar to about 1.5 bar, more preferably about 1 bar, without suffering a significant pressure drop even when the BOG is cooled while passing through the heat exchanger 100. When the state wherein the pressure difference of the hot fluid channel is at least a predetermined pressure or more, for example, 1 bar to 5 bar or more, preferably 1.5 bar to 3 bar or more, more preferably about 2 bar (200 kPa) or more, it can be determined that it is time to discharge the condensed or solidified lubricant oil.

Although the time point for removal of the condensed or solidified lubricant oil can be determined based on any one of the temperature difference of the cold flow, the temperature difference of the hot flow, and the pressure difference of the hot fluid channel as described above, the time point for removal of the condensed or solidified lubricant oil can be determined based on at least two among the temperature difference of the cold flow, the temperature difference of the hot flow, and the pressure difference of the hot fluid channel in order to improve reliability.

By way of example, when a lower value between the temperature difference of the cold flow and the temperature difference of the hot flow is maintained at 35° C. or more for 1 hour or more of when the pressure difference of the hot fluid channel is two or more times the normal pressure difference thereof or 200 kPa or more and continues for 1 hour or more, it can be determined that it is time to remove the condensed or solidified lubricant oil.

The first temperature sensor 810, the second temperature sensor 820, the third temperature sensor 830, the fourth temperature sensor 840, the first pressure sensor 910, and the second pressure sensor 920 can be considered as a detection means for detecting whether the heat exchanger 100 is clogged by the lubricant oil.

In addition, the BOG reliquefaction system according to embodiments of the present invention may further include a controller (not shown) to determine whether the heat exchanger 100 is clogged by the lubricant oil based on a detection result obtained by at least one of the first temperature sensor 810, the second temperature sensor 820, the third temperature sensor 830, the fourth temperature sensor 840, the first pressure sensor 910, and the second pressure sensor 920. The controller can be considered as a determination means for determining whether the heat exchanger 100 is clogged by the lubricant oil.

2) The Step of Opening the Bypass Valve 590 while Closing the First Valve 510 and the Second Valve 520

If it is determined in Step 1 that it is time to remove the condensed or solidified lubricant oil from the heat exchanger 100, the bypass valve 590 disposed on the bypass line BL is opened, and the first valve 510 disposed on the first supply line L1 and the second valve 520 disposed on the second supply line L2 are closed.

When the bypass valve 590 is opened while closing the first valve 510 and the second valve 520, the BOG discharged from the storage tank T is sent to the compressor 200 through the bypass line BL and is prevented from being supplied to the heat exchanger 100. Therefore, a refrigerant is not supplied to the heat exchanger 100.

3) The Step of Compressing, by the Compressor 200, BOG Discharged from the Storage Tank T and Having Passed Through the Bypass Line BL The BOG discharged from the storage tank T bypasses the heat exchanger 100 through the bypass line BL and is then sent to the compressor 200. The BOG sent to the compressor 200 undergoes increase in temperature and pressure while being compressed by the compressor 200. The BOG compressed to about 300 bar by the compressor 200 has a temperature of about 40° C. to about 45° C.

4) The Step of Sending Part or all of the Hot BOG Compressed by the Compressor 200 to the Heat Exchanger 100

When the BOG compressed by the compressor 200 is continuously supplied to the heat exchanger 100, the cold BOG used as a refrigerant in the heat exchanger 100 and discharged from the storage tank T is not supplied to the heat exchanger 100 and the hot BOG is continuously supplied to the heat exchanger 100, thereby gradually increasing the temperature of the hot fluid channel of the heat exchanger 100, through which the BOG compressed by the compressor 200 passes.

When the temperature of the hot fluid channel of the heat exchanger 100 exceeds a condensation or solidification point of the lubricant oil, the condensed or solidified lubricant oil accumulated in the heat exchanger 100 gradually melts or decreases in viscosity, and then the lubricant oil melt or having low viscosity is mixed with the BOG and exits the heat exchanger 100.

When the condensed or solidified lubricant oil is removed using the bypass line BL, the BOG is circulated through the bypass line BL, the compressor 200, the hot fluid channel of the heat exchanger 100, the pressure reducer 600, and the gas/liquid separator 700 until the heat exchanger 100 is normalized.

In addition, when the condensated or solidified lubricant oil is removed using the bypass line BL, the BOG discharged from the storage tank T and passed through the bypass line BL, the compressor 200, the hot fluid channel of the heat exchanger 100, and the pressure reducer 600 may be sent to a separate tank or another collection facility separate from the storage tank T, with the BOG mixed with the molten or viscosity-reduced lubricant oil. The BOG stored in the separate tank or another collection facility is sent to the bypass line BL to continue the process of removing the condensed or solidified lubricant oil.

Even in the structure wherein the gas/liquid separator 700 is disposed downstream of the pressure reducer 600, when the fluid composed of the BOG mixed with the molten or viscosity-reduced lubricant oil is sent to the separate tank or other collection facility, the gas/liquid separator 700 provides the same function as that of a typical BOG reliquefaction system and the molten or viscosity-reduced lubricant oil is not collected in the gas/liquid separator 700 (the molten or viscosity-reduced lubricant oil is collected by the separate tank or other collection facility separate from the storage tank T). Thus, the BOG reliquefaction system according to this embodiment can omit a gas/liquid separator configured to discharge the lubricant oil, thereby enabling cost reduction.

5) The Step of Sending the BOG Having Passed Through the Heat Exchanger 100 to the Gas/Liquid Separator 700

As the temperature of the hot fluid channel of the heat exchanger 100 increases, the condensed or solidified lubricant oil accumulated in the heat exchanger 100 gradually melts or decreases in viscosity and is then sent to the gas/liquid separator 700 after being mixed with the BOG. In the process of removing the condensed or solidified lubricant oil in the heat exchanger 100 through the bypass line BL, since the BOG is not re-liquefied, the re-liquefied gas is not collected in the gas/liquid separator 700, and the BOG and the melted or low viscosity lubricant oil are collected.

The gaseous BOG collected in the gas/liquid separator 700 is discharged from the gas/liquid separator 700 along the sixth supply line L6 and sent to the compressor 200 along the bypass line BL. Since the first valve 510 is closed in Step 2, the gaseous BOG separated by the gas/liquid separator 700 is combined with the BOG discharged from the storage tank T and sent to the compressor 200 along the bypass line BL without being sent to the cold fluid channel of the heat exchanger 100.

Supplying the gaseous BOG separated by the gas/liquid separator 700 to the bypass line BL with the first valve 510 in the closed state can prevent the lubricant oil contained in the BOG from being supplied to the heat exchanger 100, thereby preventing the cold fluid channel of the heat exchanger 100 from being blocked.

The circulation process in which the gaseous BOG collected in the gas/liquid separator 700 is discharged from the gas/liquid separator 700 along the sixth feed line L6 and then sent back to the compressor 200 along the bypass line BL continues until it is determined that the temperature of the hot fluid channel of the heat exchanger 100 is increased to the temperature of the BOG compressed by the compressor 200 and sent to the hot fluid channel of the heat exchanger 100. However, the circulation process may be continued until it is empirically determined that a sufficient time has passed.

During removal of the condensed or solidified lubricant oil from the heat exchanger 100 using the bypass line BL, the eighth valve 581 is closed to prevent the lubricant oil collected in the gas/liquid separator 700 from flowing to storage tank T along the fifth supply line L5. If the lubricant oil is introduced into the storage tank T, the liquefied gas stored in the storage tank T can be deteriorated in purity, thereby deteriorating the value of the liquefied gas.

6) The Step of Discharging Lubricant Oil from the Gas/Liquid Separator 700

The molten or viscosity-reduced lubricant oil discharged from the heat exchanger 100 is collected in the gas/liquid separator 700. For treatment of the lubricant oil collected in the gas/liquid separator 700, the BOG reliquefaction system according to this embodiment may employ the gas/liquid separator 700 obtained by improving a typical gas/liquid separator.

Figure 10:
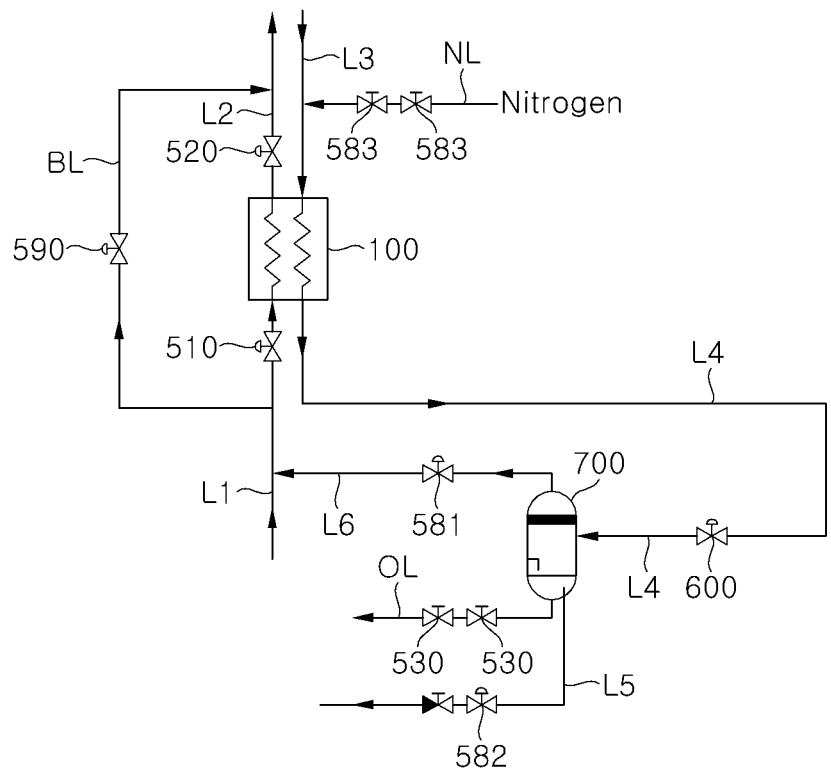
FIG. 10 is an enlarged view of a heat exchanger and a gas/liquid separator according to one embodiment of the present invention.

FIG. 10 is an enlarged view of a heat exchanger and a gas/liquid separator according to one embodiment of the present invention. In FIG. 10, some components are omitted for convenience of description.

Referring to FIG. 10, the gas/liquid separator 700 is provided with a lubricant oil discharge line OL through which the lubricant oil collected in the gas/liquid separator 700 is discharged, as well as the fifth supply line L5 through which the liquefied gas separated by the gas/liquid separator 700 is sent to the storage tank T. In order to allow the lubricant oil collected at a lower portion of the gas/liquid separator 700 to be efficiently discharged, the lubricant oil discharge line OL is connected to a lower end of the gas/liquid separator 700 and one end of the fifth supply line L5 is disposed above the lower end of the gas/liquid separator 700 in the gas/liquid separator 700 connected to the lubricant oil discharge line OL. In order to prevent the fifth supply line L5 from being clogged by the lubricant oil, it is desirable that the end of the fifth supply line L5 be disposed above the level of the lubricant oil when the amount of the lubricant oil collected in the gas/liquid separator 700 reaches the maximum value.

A third valve 530 for regulating the flow rate of fluid and opening/closing of the corresponding line may be disposed on the lubricant oil discharge line OL and may be provided in plural.

Since the lubricant oil collected in the gas/liquid separator 700 can be naturally discharged or can require a long time for discharge, the lubricant oil in the gas/liquid separator 700 may be discharged through nitrogen purging. When nitrogen is supplied at a pressure of about 5 bar to 7 bar to the gas/liquid separator 700, the internal pressure of the gas/liquid separator 700 increases and allows rapid discharge of the lubricant oil.

In order to discharge the lubricant oil from the gas/liquid separator 700 through nitrogen purging, a nitrogen supply line NL may be disposed so as to be joined to the third supply line L3 upstream of the heat exchanger 100. A number of nitrogen supply lines may be disposed at different locations as needed.

A nitrogen valve 583 for regulating the flow rate of fluid and opening/closing of the corresponding line may be disposed on the nitrogen supply line NL and is normally kept in a closed state when the nitrogen supply line NL is not used. Then, when there is a need for use of the nitrogen supply line NL to supply nitrogen to the gas/liquid separator 700 for nitrogen purging, the nitrogen valve 583 is opened. The nitrogen valve 583 may be provided in plural.

Although discharge of the lubricant oil can be performed through nitrogen purging by directly injecting nitrogen into the gas/liquid separator 700, if the nitrogen supply line for other purposes is already installed, it is desirable that the lubricant oil be discharged from the gas/liquid separator 700 using another installed nitrogen supply line which may be previously disposed for other purposes.

After the processes of sending the entirety of the BOG discharged from the storage tank T to the bypass line BL to be compressed by the compressor 200, sending the BOG compressed by the compressor 200 to the hot fluid channel of the heat exchanger 100, sending the BOG passed through the heat exchanger 100 and reduced in pressure in the pressure reducer 600 to the gas/liquid separator 700, and sending the BOG discharged from the gas/liquid separator 700 to the bypass line BL, if it is determined that most of the condensed or solidified lubricant oil in the heat exchanger 100 is collected in the gas/liquid separator 700 (that is, if it is determined that the heat exchanger 100 is normalized), nitrogen purging is performed by blocking of the BOG compressed by the compressor 200 from flowing into the heat exchanger 100 and opening the nitrogen valve 583.

7) The Step of Determining Whether the Heat Exchanger 100 is Normalized

If it is determined that the heat exchanger 100 is normalized again through discharge of the condensed or solidified lubricant oil from the heat exchanger 100 and when the process of discharging the lubricant oil from the gas/liquid separator 700 is completed, the BOG reliquefaction system is normally operated again by opening the first valve 510 and the second valve 520 while closing the bypass valve 590. When the BOG reliquefaction system is normally operated, the BOG discharged from the storage tank T is used as a refrigerant in the heat exchanger 100 and part or all of the BOG used as the refrigerant in the heat exchanger 100 is re-liquefied through compression by the compressor 200, cooling by the heat exchanger 100, and pressure reduction by the pressure reducer 600.

As in determination as to whether it is time to remove the condensed or solidified lubricant oil, determination as to whether the heat exchanger 100 is normalized again is based on at least one of the temperature difference of the cold flow, the temperature difference of the hot flow, and the pressure difference of the hot fluid channel.

In addition to the condensed or solidified lubricant oil inside the heat exchanger 100, the condensed or solidified lubricant oils accumulated in pipes, valves, instruments, and other equipment can also be removed through the aforementioned processes.

Conventionally, during the step of removing the condensed or solidified lubricant oil inside the heat exchanger 100 using the bypass line BL, the high-pressure engine and/or the low-pressure engine (hereinafter referred to as 'engine') may be driven. Upon overhaul of part of equipment included in the fuel supply system or the reliquefaction system, since fuel cannot be supplied to the engine or surplus BOG cannot be re-liquefied, the engine is generally in a non-driven state.

Conversely, if the engine can be driven during removal of the condensed or solidified lubricant oil from the heat exchanger 100 as in the present invention, since it is possible to overhaul the heat exchanger 100 during operation of the engine, there are advantages in that it is possible to propel the vessel and generate power and to remove the condensed or solidified lubricant oil using surplus BOG during overhaul of the heat exchanger 100.

Furthermore, when the engine is driven during removal of the condensed or solidified lubricant oil from the heat exchanger 100, there is an advantage in that it is possible to burn the lubricant oil mixed with the BOG during compression by the compressor 200. That is, the engine is used not only for the purpose of propelling the vessel or power generation, but also for removing the oil mixed with the BOG.

On the other hand, the process of determining based on an alarm whether it is time to remove the condensed or solidified lubricant oil may include ① alarm activation, and/or ② alarm generation.

Figure 7:
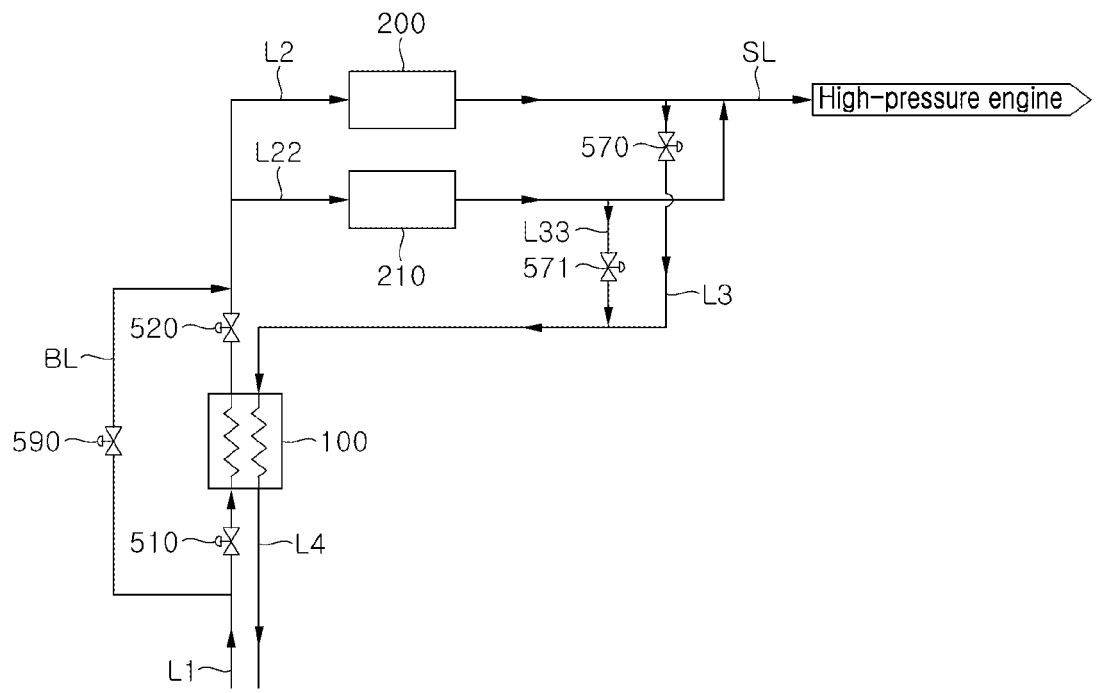
FIG. 7 is a schematic diagram of a BOG reliquefaction system according to a fourth embodiment of the present invention.
Figure 8:
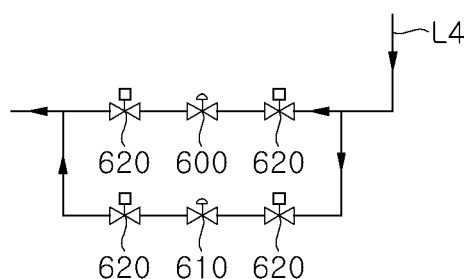
FIG. 8 is an enlarged view of a pressure reducer according to one embodiment of the present invention.
Figure 9:
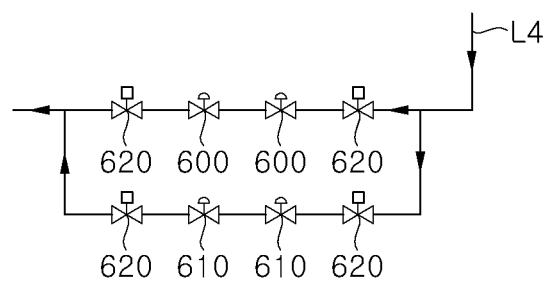
FIG. 9 is an enlarged view of a pressure reducer according to another embodiment of the present invention.

FIG. 7 is a schematic diagram of a BOG reliquefaction system according to a fourth embodiment of the present invention, FIG. 8 is an enlarged view of a pressure reducer according to one embodiment of the present invention, and FIG. 9 is an enlarged view of a pressure reducer according to another embodiment of the present invention.

Referring to FIG. 7, two compressors 200, 210 may be arranged in parallel in the present invention. The two compressors 200, 210 may have the same specifications and can act as redundancy for preparation against malfunction of any one of the compressors. Illustration of other devices is omitted for convenience of description.

Referring to FIG. 7, in the structure wherein the compressors 200, 210 are arranged in parallel, the BOG discharged from the storage tank T is sent to the second compressor 210 through the seventh supply line L22 and the BOG compressed by the second compressor 210 is partially discharged to the high-pressure engine through the fuel supply line SL while surplus BOG is sent to the heat exchanger 100 through the eighth supply line L33 to undergo the reliquefaction process. A tenth valve 571 for regulating the flow rate and opening/closing of the corresponding line may be disposed on the eighth supply line L33.

In other embodiments, two pressure reducers 600, 610 may be arranged in parallel as shown in FIG. 8 and two pairs of pressure reducers 600, 610 arranged in series may be arranged in parallel as shown in FIG. 9.

Referring to FIG. 8, both pressure reducers 600, 610 arranged in parallel can act as redundancy for preparation against malfunction of any one of the compressors, and each of the pressure reducers 600, 610 may be provided at front rear ends thereof with isolation valves 620.

Referring to FIG. 9, two pairs of pressure reducers 600, 610 connected in series are arranged in parallel. Depending upon manufacturer, two pressure reducers 600 are connected in series for pressure reduction stability. The two pairs of pressure reducers 600, 610 connected in parallel can act as redundancy for preparation against malfunction of any pair of pressure reducers.

Each of the pressure reducers 600, 610 connected in parallel may be provided at front rear ends thereof with isolation valves 620. The isolation valves 620 shown in FIG. 8 and FIG. 9 isolate the pressure reducers 600 upon maintenance or overhaul of the pressure reducers 600 due to malfunction of the pressure reducers 600, 610 and the like.

① Alarm activation

In the structure wherein the BOG reliquefaction system includes one compressor 200 and one pressure reducer 600 as shown in FIG. 2, an alarm is activated under conditions that the degree of opening of the pressure reducer 600 is a preset value or more, the seventh valve 570 and the second valve 520 are opened, and the level of liquefied gas in the gas/liquid separator 700 is a normal level.

In the structure wherein the BOG reliquefaction system includes one compressor 200 as shown in FIG. 2 and two pressure reducers 600, 610 connected in parallel as shown in FIG. 8, an alarm is activated under conditions (hereinafter referred to as 'first alarm activation condition') that the degree of opening of a first pressure reducer 600 or a second pressure reducer 610 is a preset value or more, the seventh valve 570 and the second valve 520 are opened, and the level of liquefied gas in the gas/liquid separator 700 is a normal level.

In the structure wherein the BOG reliquefaction system includes one compressor 200 as shown in FIG. 2 and two pairs of pressure reducers 600, 610 connected in parallel as shown in FIG. 9, an alarm is activated under conditions (hereinafter referred to as 'second alarm activation condition') that the degree of opening of one of two first pressure reducers 600 arranged in series or one of two second pressure reducers 610 connected in series is a preset value or more, the seventh valve 570 and the second valve 520 are opened, and the level of liquefied gas in the gas/liquid separator 700 is a normal level.

In the structure wherein the BOG reliquefaction system includes two compressors 200, 210 connected in parallel as shown in FIG. 7 and one pressure reducer 600 as shown in FIG. 2, an alarm is activated under conditions (hereinafter referred to as 'third alarm activation condition') that the degree of opening of the pressure reducer 600 is a preset value or more, the seventh valve 570 or the tenth valve 571 is opened, the second valve 520 is opened, and the level of liquefied gas in the gas/liquid separator 700 is a normal level.

In the structure wherein the BOG reliquefaction system includes two compressors 200, 210 connected in parallel as shown in FIG. 7 and two pressure reducers 600, 610 connected in parallel as shown in FIG. 8, an alarm is activated under conditions (hereinafter referred to as 'fourth alarm activation condition') that the degree of opening of the first pressure reducer 600 or the second pressure reducer 610 is a preset value or more, the seventh valve 570 or the tenth valve 571 is opened, the second valve 520 is opened, and the level of liquefied gas in the gas/liquid separator 700 is a normal level.

In the structure wherein the BOG reliquefaction system includes two compressors 200, 210 connected in parallel as shown in FIG. 7 and two pairs of pressure reducers 600, 610 connected in parallel as shown in FIG. 9, an alarm is activated under conditions (hereinafter referred to as 'fifth alarm activation condition') that the degree of opening of one of two first pressure reducer 600 arranged in series or one of two second pressure reducer 610 connected in series is a preset value or more, the seventh valve 570 or the tenth valve 571 is opened, the second valve 520 is opened, and the level of liquefied gas in the gas/liquid separator 700 is a normal level.

In the first to fifth alarm activation conditions described above, the predetermined degree of opening of the first pressure reducer 600 or the second pressure reducer 610 may be 2%, and the normal level of the liquefied gas in the gas/liquid separator 700 means the case where it can be determined that the reliquefaction process is normally carried out by confirming the re-liquefied gas in the gas/liquid separator 700.

② Alarm generation

An alarm may be generated to indicate a time point for removal of the condensed or solidified lubricant oil, if any one of the following conditions is satisfied: the condition that the temperature difference of the cold flow is a preset value or more and continues for a predetermined period of time, the condition that the temperature difference of the hot flow is a preset value or more and continues for a predetermined period of time, and the condition that the pressure difference of the hot fluid channel is a preset value or more and continues for a predetermined period of time.

In order to improve reliability, an alarm may be generated to indicate a time point for removal of the condensed or solidified lubricant oil, if at least two of the following conditions are satisfied: the condition that the temperature difference of the cold flow is a preset value or more and continues for a predetermined period of time, the condition that the temperature difference of the hot flow is a preset value or more and continues for a predetermined period of time, and the condition that the pressure difference of the hot fluid channel is a preset value or more and continues for a predetermined period of time.

Furthermore, an alarm may be generated to indicate a time point for removal of the condensed or solidified lubricant oil, if a lower value of the temperature difference of the cold flow and the temperature difference of the hot flow is a preset value or more and continues for a predetermined period of time (or condition), or if the pressure difference of the hot fluid channel is a preset value or more and continues for a predetermined period of time.

According to the present invention, abnormality of the heat exchanger, alarm generation, and the like may be determined by a suitable controller. As a controller for determining abnormality of the heat exchanger, alarm generation, and the like, a controller used by the BOG reliquefaction system according to the present invention, preferably a controller used by a vessel or an offshore structure to which the BOG reliquefaction system according to the present invention is applied, may be used, and a separate controller for determining abnormality of the heat exchanger, occurrence of an alarm, and the like may also be used.

In addition, use of the bypass line, discharge of lubricant oil, fuel supply to the engine, start or restart of the BOG reliquefaction system, and opening or closing of various valves for these components may be automatically or manually controlled by the controller.

2. The Case where the Bypass Line BL is Used to Satisfy an Intake Pressure Condition of the Compressor 200 when the Internal Pressure of the Storage Tank T is Low The compressor 200 often does not satisfy the intake pressure condition upstream of the compressor 200 in the case where the storage tank T has a low internal pressure, such as when the amount of generated BOG is small due to a small amount of liquefied gas in the storage tank T or if the amount of BOG supplied to the engine for propulsion of the vessel is large due to high speed of the vessel.

Particularly, in a PCHE (DCHE) used as the heat exchanger 100, the pressure drop is large due to a narrow fluid channel thereof when the BOG discharged from the storage tank T passes through the PCHE.

Conventionally, when the compressor 200 fails to satisfy the intake pressure condition, the recirculation valves 541, 542, 543, 544 are opened to protect the compressor 200 by recycling part or all of the BOG through the recirculation lines Rc1, Rc2, Rc3, Rc4.

However, if the intake pressure condition of the compressor 200 is satisfied by recirculating the BOG, the amount of BOG compressed by the compressor 200 is decreased, thereby causing deterioration in reliquefaction performance and failing to satisfy fuel consumption requirement for an engine. Particularly, if the engine does not satisfy the fuel consumption requirements, operation of the vessel can be significantly disturbed. Therefore, there is a need for a BOG reliquefaction method capable of satisfying the intake pressure condition for the compressor and fuel consumption requirement for the engine even when the internal pressure of the storage tank T is low.

According to the present invention, instead of providing additional equipment, the bypass line BL provided for maintenance and overhaul of the heat exchanger 100 may be used to satisfy the intake pressure condition for the compressor 200 without decreasing the amount of the BOG compressed by the compressor 200 even when the internal pressure of the storage tank T is low. It is possible to satisfy the suction pressure condition required by the compressor 200 without reducing the amount of the BOG.

According to the present invention, when the internal pressure of the storage tank T is decreased to a preset value or less, the bypass valve 590 is opened to allow part or all of the BOG discharged from the storage tank T to be directly sent to the compressor 200 through the bypass line BL bypassing the heat exchanger 100.

The amount of BOG sent to the bypass line BL can be adjusted depending upon the pressure of the storage tank T compared with the intake pressure condition required by the compressor 200. That is, all of the BOG discharged from the storage tank T may be sent to the bypass line BL by opening the bypass valve 590 while closing the first valve 510 and the second valve 520, or only some of the BOG discharged from the storage tank T may be sent to the bypass line BL and the remaining BOG may be sent to the heat exchanger 100 by partially opening the bypass valve 590, the first valve 510, and the second valve 520. That is, all of the BOG discharged from the storage tank T may be sent to the bypass line BL by opening the bypass valve 590 while closing the first valve 510 and the second valve 520, or only some of the BOG discharged from the storage tank T may be sent to the bypass line BL and the remaining BOG may be sent to the heat exchanger 100 by partially opening the bypass valve 590, the first valve 510, and the second valve 520. Pressure drop of the BOG decreases with increasing amount of the BOG bypassing the heat exchanger 100 through the bypass line BL.

Although there is an advantage of minimizing the pressure drop when the BOG discharged from the storage tank T bypasses the heat exchanger 100 and is directly sent to the compressor 200, cold heat of the BOG cannot be used for reliquefaction of the BOG. Thus, use of the bypass line BL to reduce the pressure drop and the amount of the BOG to be sent to the bypass line BL among the amount of the BOG discharged from the storage tank T are determined based on the internal pressure of the storage tank T, fuel consumption requirement for the engine, the amount of the BOG to be re-liquefied, and the like.

By way of example, it can be determined that it is advantageous to reduce the pressure drop using the bypass line BL when the internal pressure of the storage tank T is a preset value or less and the vessel is operated at a predetermined speed or more. Specifically, it can be determined that it is advantageous to reduce the pressure drop using the bypass line BL when the internal pressure of the storage tank T is 1.09 bar or less and the speed of the vessel is 17 knots or more.

In addition, the intake pressure condition of the compressor 200 is not often satisfied even when all of the BOG discharged from the storage tank T is sent to the compressor 200 through the bypass line BL. In this case, the intake pressure condition is satisfied using the recirculation lines Rc1, Rc2, Rc3, Rc4.

That is, when the intake pressure condition of the compressor 200 cannot be satisfied due to reduction in pressure of the storage tank T, the compressor 200 is protected using the recirculation lines Rc1, Rc2, Rc3, Rc4 in the related art, whereas, according to the present invention, the bypass line BL is primarily used in order to satisfy the intake pressure condition of the compressor 200, and the recirculation lines Rc1, Rc2, Rc3, Rc4 are secondarily used when the intake pressure condition of the compressor 200 cannot be satisfied even by sending all of the BOG discharged from the storage tank T to the compressor through the bypass line BL.

In order to satisfy the intake pressure condition of the compressor 200 through primary use of the bypass line BL and secondary use of the recirculation lines Rc1, Rc2, Rc3, Rc4, a pressure condition under which the bypass valve 590 is opened is set to a higher value than a pressure condition under which the recirculation valves 541, 542, 543, 544 are opened.

The condition under which the recirculation valves 541, 542, 543, 544 are opened and the condition under which the bypass valve 590 is open are preferably determined based on pressure upstream of the compressor 200. Alternatively, these conditions may be determined based on the internal pressure of the storage tank T.

The pressure upstream of the compressor 200 may be measured by a third pressure sensor (not shown) disposed upstream of the compressor 200 and the internal pressure of the storage tank T may be measured by a fourth pressure sensor (not shown).

On the other hand, in the structure wherein the sixth supply line L6 for discharging the gaseous BOG separated by the gas/liquid separator 700 is joined to the first supply line L1 at a location downstream of a branch point of the bypass line BL branched from the first supply line L1, some of the BOG discharged from the storage tank T while preventing the pressure drop may be used as a refrigerant in the heat exchanger 100 by directly sending the gaseous BOG separated by the gas/liquid separator 700 to the bypass line BL, with all of the bypass valve 590, the first valve 510, and the second valve 520 open in operation of the system.

Since the temperature of the gaseous BOG separated by the gas/liquid separator 700 is lower than the temperature of the BOG discharged from the storage tank T and supplied to the heat exchanger 100, and cooling efficiency of the heat exchanger 100 can be deteriorated when the gaseous BOG separated by the gas/liquid separator 700 is directly sent to the bypass line BL, it is desirable that at least some of the gaseous BOG separated by the gas/liquid separator 700 be sent to the heat exchanger 100.

Here, if the amount of the BOG generated in the storage tank T is less than the amount of the BOG required by the engine as fuel, it may not be necessary to re-liquefy the BOG. However, when there is no need for reliquefaction of the BOG, all of the gaseous BOGs separated by the gas/liquid separator 700 may be sent to the bypass line BL, since it is not necessary to supply the refrigerant to the heat exchanger 100.

Accordingly, in the present invention, the sixth supply line L6 is joined to the first supply line L1 at a location upstream of the branch point of the bypass line BL branched from the first supply line L1. In the structure wherein the sixth supply line L6 is joined to the first supply line L1 upstream of the branch point of the bypass line, the BOG discharged from the storage tank T and the gaseous BOG separated by the gas/liquid separator 700 are combined with each other at a location upstream of the branch point of the bypass line BL, and then the amount of the BOG to be sent to the bypass line BL and the heat exchanger 100 are determined depending upon the degrees of opening of the bypass valve 590 and the first valve 510, thereby enabling easy control of the system and preventing the gaseous BOG separated by the gas/liquid separator 700 from being directly sent to the bypass line BL.

Preferably, the bypass valve 590 is a valve providing a higher response than a typical valve in order to allow rapid regulation of the degree of opening depending upon the pressure change of the storage tank T.

Figure 3:
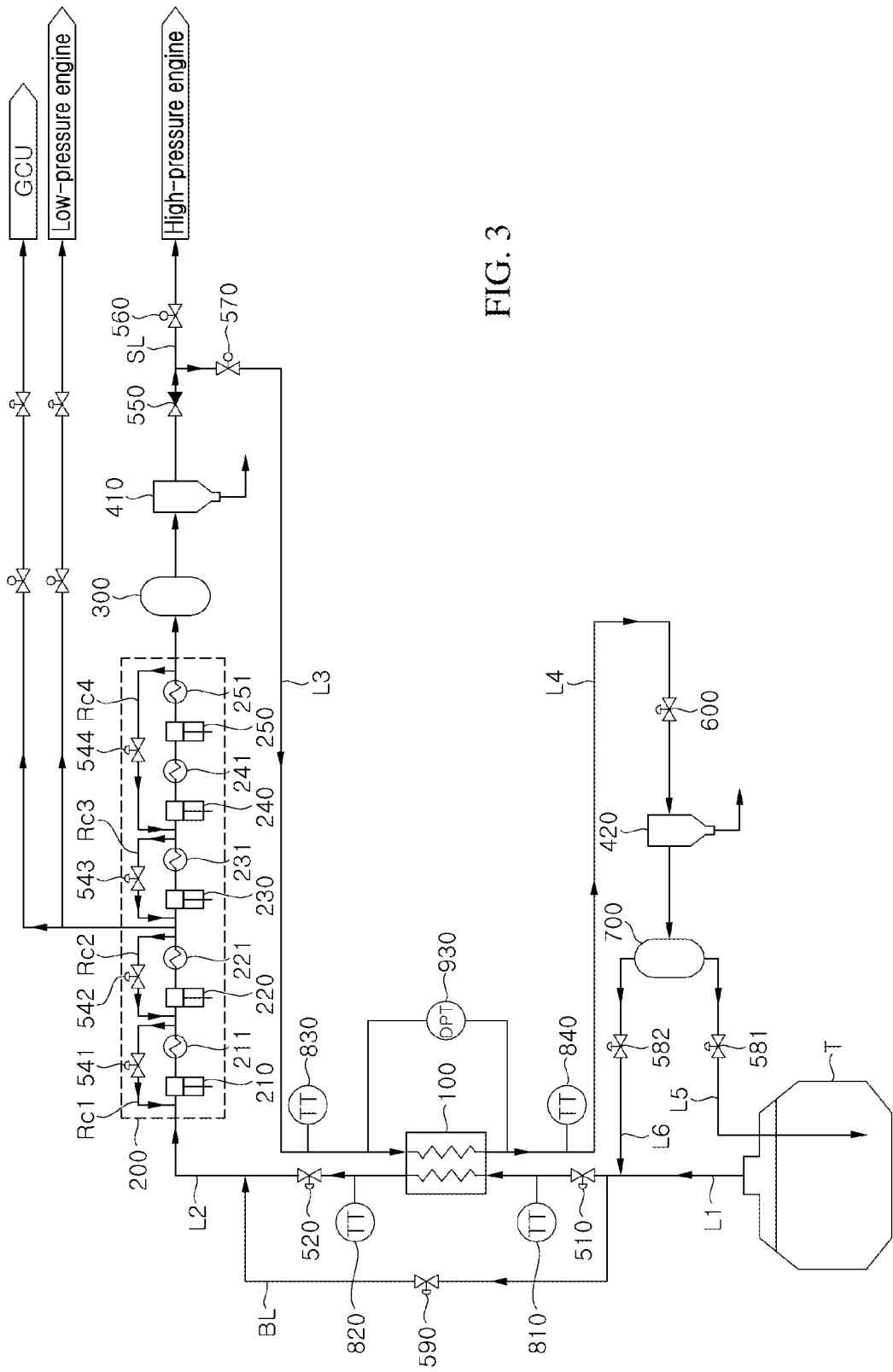
FIG. 3 is a schematic diagram of a BOG reliquefaction system according to a third embodiment of the present invention.

FIG. 3 is a schematic diagram of a BOG reliquefaction system according to a third embodiment of the present invention.

Referring to FIG. 3, the BOG reliquefaction system according to the third embodiment of the invention is different from the BOG reliquefaction system according to the first embodiment shown in FIG. 1 in that the BOG reliquefaction system according to the third embodiment includes a pressure difference sensor 930 instead of the first pressure sensor 910 and the second pressure sensor 920, and the following description will focus on the different features of the BOG reliquefaction system according to the third embodiment. Descriptions of the same components as the BOG reliquefaction system according to the first embodiment will be omitted.

Unlike the first embodiment, the BOG reliquefaction system according to the third embodiment includes the pressure difference sensor 930 that measures a pressure difference between the third supply line L3 upstream of the heat exchanger 100 and the fourth supply line L4 downstream of the heat exchanger 100 instead of the first pressure sensor 910 and the second pressure sensor 920.

The pressure difference of the hot fluid channel can be obtained by the pressure difference sensor 930, and, as in the first embodiment, it can be determined that it is time to remove the condensed or solidified lubricant oil, based on at least one of the pressure difference of the hot fluid channel, the temperature difference of the cold flow and the temperature difference of the hot flow.

It will be apparent to those skilled in the art that the present invention is not limited to the embodiments described above and various modifications, changes, alterations, and equivalent embodiments can be made art without departing from the spirit and scope of the invention.

What is claimed is:

1. A boil-off gas (BOG) reliquefaction system comprising:
    a compressor configured to compress BOG from a storage tank to provide compressed BOG (CBOG);
    a heat exchanger configured to cool a flow of the CBOG from the compressor through heat exchange using the BOG from the storage tank;
    a pressure reducer disposed downstream of the heat exchanger and configured to liquefy at least part of the flow of the CBOG from the heat exchanger to provide a flow of gas-liquid mixture, wherein the compressor is configured to use lubricant oil, at least part of which is contained in the flow of the CBOG and the flow of the gas-liquid mixture;
    a gas/liquid separator disposed downstream of the pressure reducer and configured to separate the gas-liquid mixture discharged from the pressure reducer into liquefied gas generated through reliquefaction and gaseous BOG; and
    an oil filter disposed downstream of the pressure reducer and comprising a mesh configured to screen at least part of the lubricant oil in the gaseous BOG from the gas/liquid separator,
    wherein the oil filter is disposed on a sixth supply line through which the gaseous BOG separated by the gas/liquid separator is discharged,
    wherein the oil filter comprises:
    an oil filter body having a bottom end, a top end, and the mesh between the bottom end and the top end, wherein the oil filter body defines a longitudinal central axis extending from the bottom end to the top end;
        an inlet port disposed at a lower portion of the oil filter body, wherein the gaseous BOG from the gas/liquid separator enters into the oil filter body through the inlet port; and
        an outlet port disposed at an upper portion of the oil filter body, wherein the gaseous BOG that passes through the mesh exits out of the oil filter body through the outlet port,
    wherein the inlet port is spaced apart from the bottom end of the oil filter body,
    wherein the outlet port is spaced apart from the top end of the oil filter body,
    wherein the mesh includes a bottom end and a top end,
    wherein the oil filter body defines a virtual line perpendicular to the longitudinal central axis and passing through the bottom end of the oil filter body,
    wherein a shortest distance between the virtual line and the bottom end of the mesh is greater than a shortest distance between the virtual line and the inlet port,
    wherein a shortest distance between the virtual line and the outlet port is greater than a shortest distance between the virtual line and the top end of the mesh.

2. The BOG reliquefaction system according to claim 1, wherein the gaseous BOG separated by the gas/liquid separator and discharged along the sixth supply line is sent to the heat exchanger with the BOG from the storage tank.

3. The BOG reliquefaction system according to claim 2, wherein the gaseous BOG passes through the mesh of the oil filter by entering into a lower portion of the mesh and exiting from a higher portion of the mesh.

4. The BOG reliquefaction system according to claim 1, wherein the compressor compresses the BOG to a pressure of 150 bar to 350 bar.

5. The BOG reliquefaction system according to claim 1, wherein the heat exchanger is a printed circuit heat exchanger (PCHE).

6. The BOG reliquefaction system according to claim 1, further comprising:
    a bypass line through which the BOG is supplied to the compressor after bypassing the heat exchanger.

7. The BOG reliquefaction system according to claim 6, further comprising:
    a first valve disposed upstream of a cold fluid channel of the heat exchanger and configured to regulate a flow rate of the BOG from the storage tank and opening/closing of a corresponding supply line,
    wherein the bypass line is branched from the corresponding supply line upstream of the first valve.

8. The BOG reliquefaction system according to claim 6, further comprising:
    a second valve disposed downstream of a cold fluid channel of the heat exchanger and configured to regulate a flow rate of the BOG from the heat exchanger and opening/closing of a corresponding supply line,
    wherein the bypass line is joined to the corresponding supply line downstream of the second valve.

9. The BOG reliquefaction system according to claim 1, further comprising:
    a first oil filter disposed downstream of the compressor and configured to filter at least part of the lubricant oil from the flow of the CBOG.

10. The BOG reliquefaction system according to claim 9, wherein the first oil filter is configured to filter at least part of the lubricant oil having a vapor phase or mist phase.

11. The BOG reliquefaction system according to claim 1, wherein the compressor is configured to compress at least a portion of the BOG to a pressure of 251 bar to 350 bar.

* * * * *